(12) United States Patent
Morad et al.

(10) Patent No.: US 9,060,299 B2
(45) Date of Patent: Jun. 16, 2015

(54) METHOD AND SYSTEM FOR OBTAINING RADIO ACCESS NETWORK (RAN) INFORMATION OF CELLULAR TELECOMMUNICATIONS NETWORKS

(75) Inventors: Roy Morad, Hod-HaSharon (IL); Idan Cohen, Gan-Yavne (IL); Ido Susan, Herzlia (IL)

(73) Assignee: CISCO TECHNOLOGY, INC., San Jose, CA (US)

( * ) Notice: Subject to any disclaimer, the term of this patent is extended or adjusted under 35 U.S.C. 154(b) by 615 days.

(21) Appl. No.: 13/267,101

(22) Filed: Oct. 6, 2011

(65) Prior Publication Data

US 2012/0142347 A1    Jun. 7, 2012

Related U.S. Application Data

(63) Continuation of application No. PCT/IB2010/051400, filed on Mar. 31, 2010.

(30) Foreign Application Priority Data

Apr. 7, 2009    (IL) .......................................... 198100

(51) Int. Cl.
| | |
|---|---|
| *H04W 4/00* | (2009.01) |
| *H04W 24/06* | (2009.01) |
| *H04W 24/00* | (2009.01) |
| *H04W 36/00* | (2009.01) |
| *H04W 16/08* | (2009.01) |
| *H04W 24/10* | (2009.01) |
| *H04W 60/00* | (2009.01) |

(52) U.S. Cl.
CPC .............. *H04W 24/06* (2013.01); *H04W 16/08* (2013.01); *H04W 24/10* (2013.01); *H04W 60/00* (2013.01)

(58) Field of Classification Search
CPC ..... H04W 16/06; H04W 36/22; H04W 36/14; H04W 36/165; H04W 36/16
See application file for complete search history.

(56) References Cited

U.S. PATENT DOCUMENTS

| | | | |
|---|---|---|---|
| 7,187,934 | B2 | 3/2007 | Turina et al. |
| 2003/0222819 | A1* | 12/2003 | Karr et al. ..................... 342/457 |
| 2006/0009237 | A1* | 1/2006 | Chen et al. ................. 455/456.1 |

(Continued)

FOREIGN PATENT DOCUMENTS

| | | |
|---|---|---|
| CN | 101094483 A | 12/2007 |
| EP | 1981305 | 10/2008 |

(Continued)

OTHER PUBLICATIONS

First Chinese Office Action for Appln. No. 201080025271.2 of Mar. 31, 2010 along with English language translation.

(Continued)

*Primary Examiner* — Timothy Pham
(74) *Attorney, Agent, or Firm* — Patent Capital Group

(57) ABSTRACT

A system for obtaining information relating to an idle mobile station in a cellular network is provided. The system includes a computing platform which is in communication with a radio network controller of the cellular network. The computing platform is configured for (i) generating and sending an input signal through the radio network controller to the radio access network; and (ii) identifying in data outputted by the radio network controller an output signal resulting from the input signal, the output signal including information relating to at least one idle mobile station.

20 Claims, 24 Drawing Sheets

(56) References Cited

U.S. PATENT DOCUMENTS

| | | | |
|---|---|---|---|
| 2006/0128394 A1* | 6/2006 | Turina et al. | 455/453 |
| 2008/0167041 A1 | 7/2008 | Wang et al. | |
| 2008/0261602 A1 | 10/2008 | Livneh | |
| 2009/0010213 A1 | 1/2009 | Yamada et al. | |
| 2009/0061879 A9 | 3/2009 | Gallagher et al. | |
| 2011/0076964 A1* | 3/2011 | Dottling et al. | 455/68 |

FOREIGN PATENT DOCUMENTS

| | | |
|---|---|---|
| JP | 2002-10316 A | 1/2002 |
| RU | 2263412 C2 | 10/2005 |
| RU | 2277762 C2 | 6/2006 |
| WO | WO99/17573 | 4/1999 |
| WO | 2006/065198 A1 | 6/2006 |
| WO | 2007/100230 A1 | 9/2007 |
| WO | 2008/088258 A | 7/2008 |
| WO | WO 2008/085838 | 7/2008 |
| WO | WO 2008/131139 | 10/2008 |
| WO | WO 2010/116292 | 10/2010 |

OTHER PUBLICATIONS

First Office Action for Russian patent application along with English language translation issued Mar. 3, 2014.

Search Report and Written Opinion Dated Apr. 19, 2012 From the Intellectual Property Office of Singapore Issued by the Danish Patent and Trademark Office on Mar. 15, 2012 Re. Application No. 201106998-6.

International Preliminary Report on Patentability Dated Oct. 20, 2011 From the International Bureau of WIPO Re. Application No. PCT/IB2010/051400.

International Search Report and the Written Opinion Dated Sep. 16, 2010 From the International Searching Authority Re. Application No. PCT/IB2010/051400.

First Japanese Office Action for Appln. No. 201080025271.2 of Mar. 31, 2010 along with English language translation.

Japanese Notice of Reason for Rejection for Appln. No. 2012-504108 mailed Nov. 29, 2013 along with English language translation.

PRC May 19, 2014 SIPO Second Office Action from Chinese Application No. 201080025271.2 [with English translation].

PRC Sep. 11, 2014 SIPO Third Office Action from Chinese Application No. 201080025271.2 [with English translation].

ILPO Oct. 11, 2014 First Office Action from Israeli Application No. IL215598 (with English translation).

"ETSI TS 125 304 V10.2.0, Technical Specification: Universal Mobile Telecommunications System (UMTS); User Equipment (UE) procedures in idle mode and procedures for cell reselection in connected mode (3GPP TS 25.304 version 10.2.0 Release 10);" European Telecommunications Standards Institute 2011 (ETSI), 650 Route des Lucioles, F-06921 Sophia Antipolis Cedex-France; Oct. 2011, 54 pages.

EPO Mar. 19, 2015 Extended Search Report and Written Opinion from European Application No. 10761256.6.

* cited by examiner

| UMTS Cell Configuration Sample | |
|---|---|
| Cell Identifier | Cell ID |
| Registration Area | Location Area Code (LAC) |
| | Routing Area Code (RAC) |
| | Service Area Code (SAC) |
| Camping Cell Thresholds | S Inter/intra/rat search |
| | Qqualmin |
| | Qrxlevmin |
| | Qoffset |
| | Qhyst |
| Active mode | Access class |
| | Handover type |
| | Individual offset |
| | Power offset |
| Radio Configuration | BCH Power |
| | Primary CPICH Power |
| | Maximum Transmission Power |
| Cell Broadcast | Broadcast Massage |

FIG. 2B

| Cell Configuration Information |
|---|
| Cell Identifier |
| Registration Area |
| Camping Cell Thresholds |
| Active mode |
| Radio Configuration |
| Cell Broadcast |

FIG. 2A

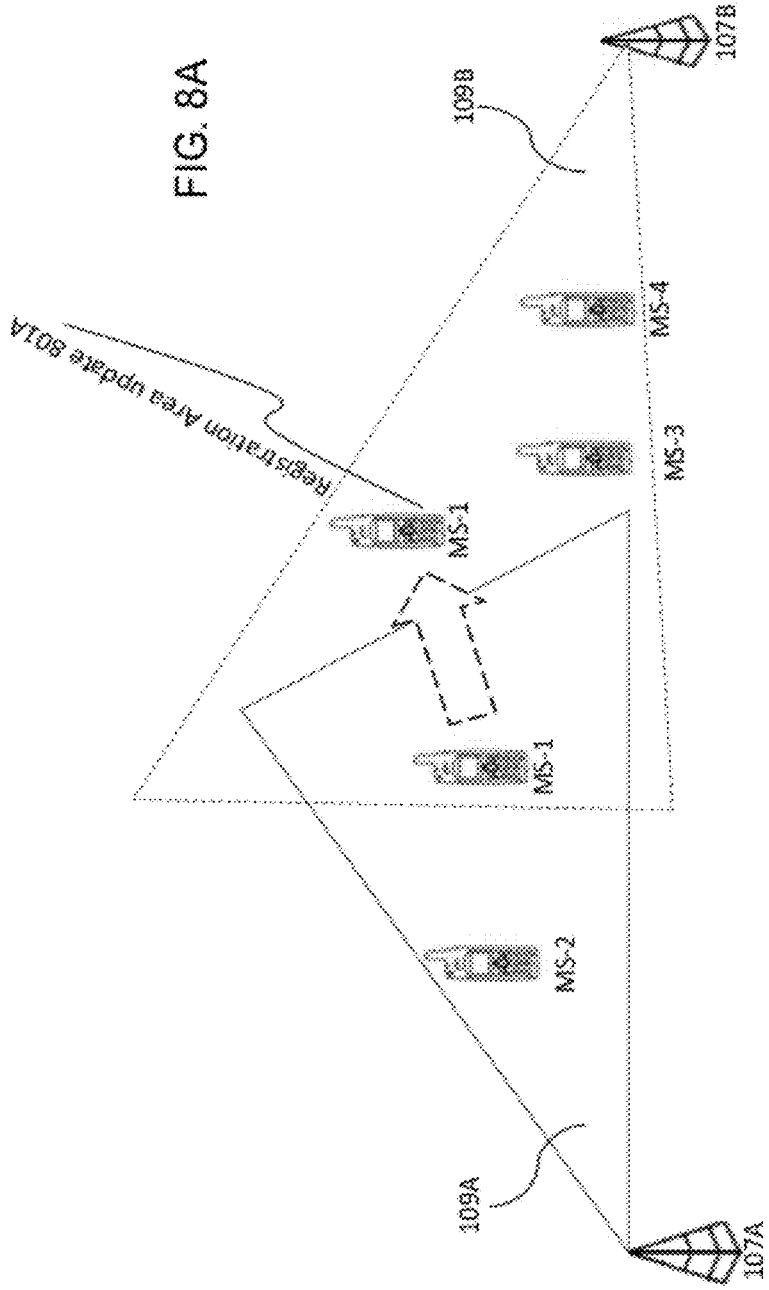

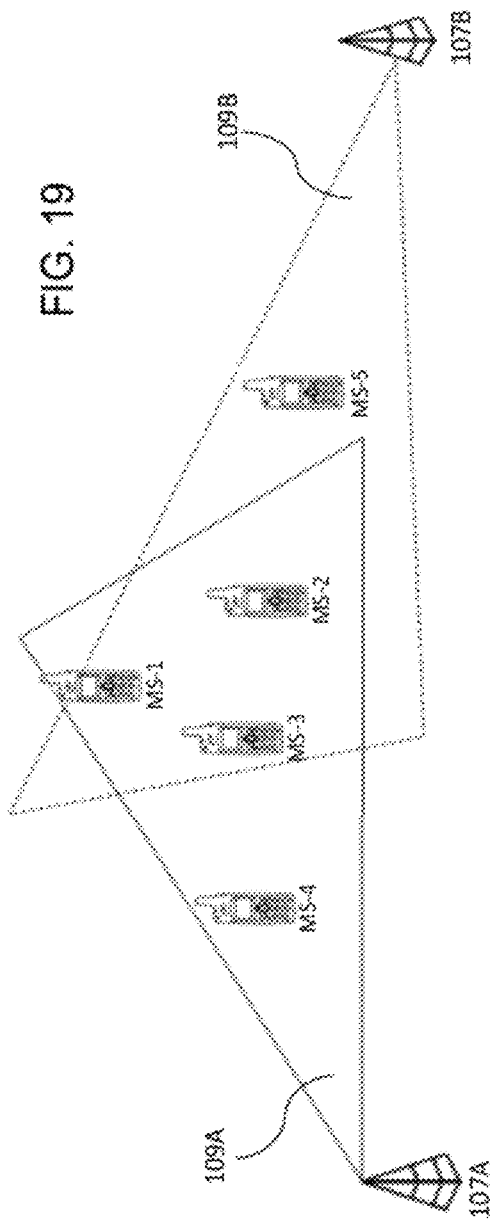

FIG. 20B

T=1: Change CCT from -105 (dBm) to -70 (dBm) for 109A

| Mobile Station | MS-1 | | MS-2 | | MS-3 | | MS-4 | | MS-5 | |
|---|---|---|---|---|---|---|---|---|---|---|
| Cell | 109A | 109B | 109A | 109B | 109A | 109B | 109A | 109B | 109A | 109B |
| Present camping cell | YES | NO | YES | NO | YES | NO | NO | YES | NO | YES |
| Reporting Mode | YES | NO | YES | NO | YES | NO | YES | NO | YES | NO |
| Reception Signal Strength (dBm) | -60 | -75 | -65 | -80 | -85 | -100 | -50 | N/A | N/A | -50 |
| CCT (dBm) | (-70)* | -105 | (-70)* | -105 | (-70)* | -105 | (-70)* | N/A | N/A | -105 |
| CCD Decision | Stay camped on Cell-A | | Stay camped on Cell-A | | Change to Camp on Cell-B* | | Stay camped on Cell-A | | Stay camped on Cell-B | |

FIG. 20C

T=2: Change CCT from -70(dBm) to -49(dBm) for 109A

| Mobile Station | MS-1 | | MS-2 | | MS-3 | | MS-4 | | MS-5 | |
|---|---|---|---|---|---|---|---|---|---|---|
| Cell | 109A | 109B | 109A | 109B | 109A | 109B | 109A | 109B | 109A | 109B |
| Present camping cell | (YES)* | NO | (NO)* | (YES)* | (NO)* | (YES)* | YES | NO | NO | YES |
| Reporting Mode | YES | NO | YES | NO | YES | NO | YES | NO | YES | NO |
| Reception Signal Strength (dBm) | -60 | -75 | -65 | -80 | -85 | -100 | -50 | N/A | N/A | -50 |
| CCT (dBm) | (-49)* | -105 | (-49)* | -105 | (-49)* | -105 | (-49)* | N/A | N/A | -105 |
| CCD Decision | Change to camp on Cell-B* | | Change to camp on Cell-B* | | Stay camped on Cell-B | | Enter No Service Mode* | | Stay camped on Cell-B | |

FIG. 20D

T=3: Change CCT from -49(dBm) to -105(dBm) for 109A

| Mobile Station | MS-1 | | MS-2 | | MS-3 | | MS-4 | | MS-5 | |
|---|---|---|---|---|---|---|---|---|---|---|
| Cell | 109A | 109B | 109A | 109B | 109A | 109B | 109A | 109B | 109A | 109B |
| Present camping cell | (NO)* | (YES)* | (NO)* | (YES)* | NO | YES | (NO)* | (YES)* | NO | YES |
| Reporting Mode | YES | NO | YES | NO | YES | NO | YES | NO | YES | NO |
| Reception Signal Strength (dBm) | -60 | -75 | -65 | -80 | -85 | -100 | -50 | N/A | N/A | -50 |
| CCT (dBm) | (-105)* | -105 | (-105)* | -105 | (-105)* | -105 | (-105)* | N/A | N/A | -105 |
| CCD Decision | Change to camp on Cell-A* | | Change to camp on Cell-A* | | Change to camp on Cell-A* | | Change to camp on Cell-A* | | Stay camped on Cell-B | |

T=0

| Mobile Station | MS-1 | | MS-2 | | MS-3 | | MS-4 | | MS-5 | |
|---|---|---|---|---|---|---|---|---|---|---|
| Cell | 109A | 109B | 109A | 109B | 109A | 109B | 109A | 109B | 109A | 109B |
| Present camping cell | YES | NO | YES | NO | YES | NO | YES | NO | NO | YES |
| Reporting Mode | YES | NO | YES | NO | YES | NO | YES | NA | YES | NO |
| Reception Signal Strength (dBm) | -60 | -75 | -65 | -80 | -85 | -100 | -50 | NA | NA | -50 |
| simulated CCT (dBm) | -105 | -105 | -105 | -105 | -105 | -105 | -105 | NA | NA | -105 |
| simulated COD Decision | Stay camped on Cell-A | | Stay camped on Cell-A | | Stay camped on Cell-A | | Stay camped on Cell-A | | Stay camped on Cell-B | |

T=1: Change CCT from -105 (dBm) to -70 (dBm) for 109A

| Mobile Station | MS-1 | | MS-2 | | MS-3 | | MS-4 | | MS-5 | |
|---|---|---|---|---|---|---|---|---|---|---|
| Cell | 109A | 109B | 109A | 109B | 109A | 109B | 109A | 109B | 109A | 109B |
| Present camping cell | YES | NO | YES | NO | YES | NO | YES | NO | NO | YES |
| Reporting Mode | NO | NO | YES | NO | YES | NO | YES | NO | YES | NO |
| Reception Signal Strength (dBm) | -60 | -75 | -65 | -80 | -85 | -100 | -50 | NA | NA | -50 |
| simulated CCT (dBm) | (-70)* | -105 | (-70)* | -105 | (-70)* | -105 | (-70)* | NA | NA | -105 |
| simulated CCD Decision | do nothing | | do nothing | | (transmit Reporting Event)* | | do nothing | | do nothing | |

FIG. 21C

T=2: Change CCT from -70(dBm) to -49(dBm) for 109A

| Mobile Station | MS-1 | | MS-2 | | MS-3 | | MS-4 | | MS-5 | |
|---|---|---|---|---|---|---|---|---|---|---|
| Cell | 109A | 109B | 109A | 109B | 109A | 109B | 109A | 109B | 109A | 109B |
| Present camping cell | YES | (NO)* | YES | (YES)* | (NO)* | YES | YES | NO | NO | YES |
| Reporting Mode | NO | NO | YES | NO | YES | NO | YES | NO | YES | NO |
| Reception Signal Strength (dBm) | -60 | -75 | -65 | -80 | -85 | -100 | -50 | NA | NA | -50 |
| simulated CCT (dBm) | (-49)* | -105 | (-49)* | -105 | (-49)* | -105 | (-49)* | NA | NA | -105 |
| simulated CCD Decision | (transmit Reporting Event)* | | (transmit Reporting Event)* | | do nothing | | do nothing | | do nothing | |

FIG. 21D

T=3: Change CCT from -49(dBm) to -105(dBm) for 109A

| Mobile Station | MS-1 | | MS-2 | | MS-3 | | MS-4 | | MS-5 | |
|---|---|---|---|---|---|---|---|---|---|---|
| Cell | 109A | 109B | 109A | 109B | 109A | 109B | 109A | 109B | 109A | 109B |
| Present camping cell | (NO)* | YES | (NO)* | YES | NO | YES | (NO)* | YES | NO | YES |
| Reporting Mode | YES | NO | YES | NO | YES | NO | YES | NO | YES | NO |
| Reception Signal Strength (dBm) | -60 | -75 | -65 | -80 | -85 | -100 | -50 | NA | NA | -50 |
| simulated CCT (dBm) | (-105)* | -105 | (-105)* | -105 | (-105)* | -105 | (-105)* | NA | NA | -105 |
| simulated CCD Decision | do nothing | | do nothing | | do nothing | | (transmit Reporting Event)* | | do nothing | |

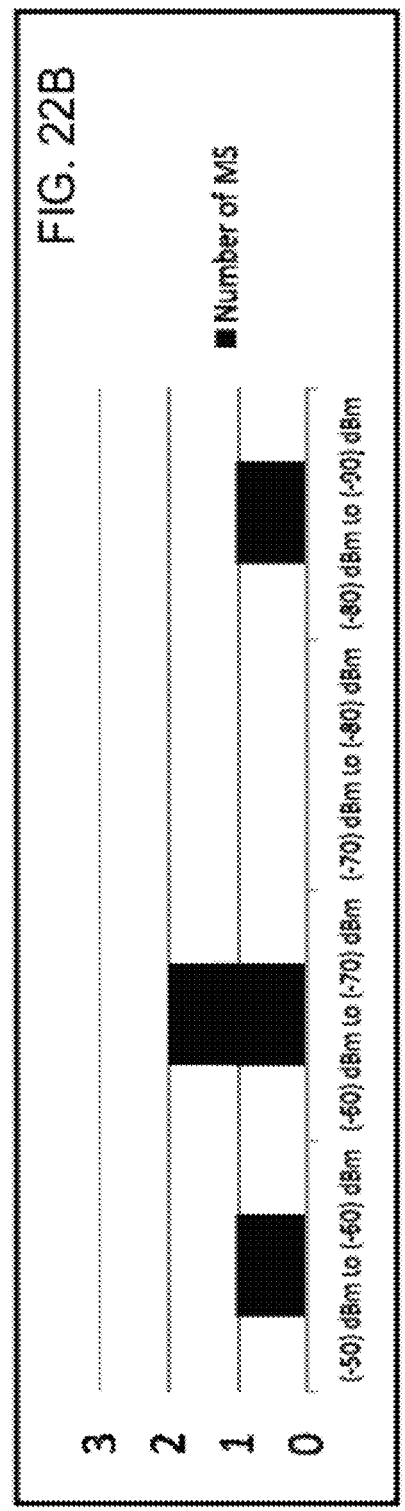

METHOD AND SYSTEM FOR OBTAINING RADIO ACCESS NETWORK (RAN) INFORMATION OF CELLULAR TELECOMMUNICATIONS NETWORKS

RELATED APPLICATIONS

This application is a continuation of PCT Patent Application No. PCT/IB2010/051400 having International filing date of Mar. 31, 2010, which claims the benefit of priority of Israel Patent Application No. 198100 filed on Apr. 7, 2009. The contents of the above applications are all incorporated herein by reference.

FIELD OF THE INVENTION

The present invention relates to methods and systems for obtaining Radio Access Network (RAN) information of cellular telecommunications networks.

BACKGROUND OF THE INVENTION

Cellular telecommunications networks include a core network for switching purposes and a so-called Radio Access Network (RAN) including a multitude of cells providing service to mobile stations. RANs are divided into registration areas which typically include from several to sometimes hundreds of contiguous cells. Cellular telecommunications networks are designed with overlapping contiguous cells to enable smooth handovers of mobile stations between adjacent cells as mobile stations change their geographical location. Cells include a Cell Configuration Register (CCR) for storing cell configuration information, for example, cell identity, its registration area, broadcasting strength, etc.

Mobile stations have two operative states as follows:

First, a so-called default passive or idle state in which the mobile stations are in reception mode only. Passive mobile stations are located in a so-called camping cell. Passive mobile stations do not send measurements reports to the radio access network to save battery consumption and network resources.

And second, a so-called active state in which the mobile stations are in a bi-directional communication session with their host network. Active mobile stations are located in at least one so-called serving cell. Serving cells can change during a bi-directional communication session but an active mobile station's initial serving cell is the last camping cell when in its passive state before becoming active. Active mobile stations send measurements reports to the radio access network including inter alia its present at least one serving cell, quality of signal reception, and the like.

Mobile stations are pre-installed with a native Camping Cell Determination (CCD) mechanism for periodically determining a preferred camping cell from two or more available camping cells for receiving service in their passive state. Passive mobile stations automatically switch into their active states to upload registration area reporting events to their core network in the case of a change of their registration areas due to possible changes in their geographical location, their preferred camping cell, and the like. These registration area reporting events are important for assisting the core network to route services to mobile stations.

Cellular network operators are required to maintain very high grade of service and are constantly being challenged by a growing demand for more coverage areas, increasing traffic capacity, more and new services and better quality of service. Such needs require cellular network operators to constantly monitor the state and condition of the entire network and address a great variety of problems that affect different parts of the network and subscriber experience. Up to the present time, cellular network operators have three main information sources on which they can rely for detecting and diagnosing network operating problems such as load balancing, low quality of service, dropped calls, coverage holes, and the like. The information sources are as follows:

(a) Signal measurements reports transmitted by active mobile stations during their communication sessions. However, active mobile stations typically constitute no more than about 10% of a cellular network operator's entire subscriber base and therefore such information requires long periods of acquisition, and is statistical by nature.

(b) So-called drive tests involving vehicles equipped with GPS and mobile stations and travelling along predetermined routes. Such information acquisition is time and resource consuming and does not supply cellular network operators with indicative real-time information about the state of their entire network and areas where subscribers might experience poor service.

(c) Probes and Operation Support System (OSS) that monitor interfaces between network entities. In order to acquire such information, it is required to deploy probes on several interfaces, and to analyze their data. This approach relies on detecting anomalies in data traffic in order to detect and analyze the above problems.

SUMMARY OF THE INVENTION

Generally speaking, the present invention is directed toward method and systems for obtaining Radio Access Network (RAN) information from passive mobile stations for monitoring, analyzing and optionally providing fixes to the operation of cellular telecommunications networks and/or detect the location of MS. The present invention performs actions at the Core Network (CN) level that in turn creates causative traffic on which it can infer RAN information.

The Network Operations System (NOS) of the present invention includes a Camping Cell Configuration Manipulation (CCCM) module for changing values of one of more parameters of a camping cell as processed by the CCD mechanisms of passive mobile stations camped on the camping cell for determining whether they remain on their camping cell, they should camp on a neighboring cell for reception purpose or enter no service mode if no cell can provide adequate service. The passive mobile stations are switched into a reporting mode in which they upload reporting events under certain circumstances. The NOS also includes a Reporting Event Acquisition (REA) module for capturing uploaded reporting events. The NOS further includes a Network Operations Analytics (NOA) module for processing uploaded reporting events for determining network operations metrics and providing information regarding one or more mobile stations.

The present invention can produce various types of RAN information, all in accordance to the selected CCT parameter. Without intention of being limited in any way;

The NOS of the present invention can be implemented in one of two preferred embodiments as follows:

First, a Mobile Station (MS) manipulating embodiment in which the CCCM module changes actual values of a selected cell's CCR for processing by passive mobile stations' native CCD mechanism. In this embodiment, passive mobile stations upload reporting events indicative of a real change in the relationship between themselves and their host network.

Exemplary reporting events include inter alia GSM and UMTS LAC updates, GSM and UMTS RAC updates, and the like.

And second, a client assisted embodiment in which at least some mobile devices are provided with a suitable hardware or software implemented client application including a CCD simulator which is operable in a similar manner as its native CCD mechanism. In this case, the CCCM module sends Point To Multi Point (PTMP) messages to the passive mobile stations camping on a selected cell with simulated CCR values for processing by the CCD simulator. The CCD simulator uploads reporting events which would be indicative of a change in the relationship between the passive mobile station and their host network if they had been uploaded by the native CCD mechanism. Such reporting events can be uploaded via various signaling messages, SMS, a data session, and the like. Preferably and optionally messages could contain supplementary data such as GPS coordinates (incase the device has a GPS module), and other local data stored at the device.

BRIEF DESCRIPTION OF DRAWINGS

For better understanding of the present invention, reference will now be made by way of non limiting examples to the accompanying drawings in which similar parts are likewise numbered, and in which:

FIG. 2A shows a Cell Configuration Register listing typical cell configuration information;

FIG. 2B shows a UMTS Cell Configuration Register listing UMTS cell configuration information;

FIG. 8A shows a later state of FIG. 7's four mobile stations pursuant to one of the mobile stations having moved to camp on a new cell as a result of physically moving out of the coverage area of the previous camping cell;

FIG. 19 is a pictorial representation of five passive mobile devices camped on two overlapping cells;

FIGS. 20A to 20D are tables illustrating the method of PMS segmentation including a Mobile Station (MS) manipulating Network Operations System (NOS) in accordance with a first preferred embodiment of the present invention;

FIGS. 21A to 21D are tables illustrating the method of PMS segmentation including a client assisted Network Operations System (NOS) in accordance with a second preferred embodiment of the present invention; and FIGS. 22A to 22B show the end result of PMS segmentation;

DETAILED DESCRIPTION OF PREFERRED EMBODIMENTS OF THE INVENTION

The present invention is described with reference to a UMTS (Universal Mobile Telecommunications System). The present invention can be equally applied to any cellular telecommunications system providing communication services for a mobile station capable of moving between cells. For instance, such cellular telecommunications systems can use a variety of multiple access techniques such as Frequency Division Multiplexing (FDM), Time Division Multiplexing (TDM), Code Division Multiplexing (CDM), Third Generation Partnership Project (3GPP), Long-Term Evolution (LTE) systems, and others.

Approaches for maximizing the capacity and service quality of a cellular network are well known in the art. Such approaches typically involve monitoring and adjusting communication traffic resulting from active mobile stations.

While reducing the present invention to practice, the present inventors postulated that the quality of service of a cellular network can be greatly improved by monitoring parameters associated with radio communication between, for example, idle mobile stations and the network and adjusting network parameters accordingly in order, for example, to steer a mobile station to a suitable pre-selected neighboring cell.

Although monitoring of network resources for the purpose of steering of idle mobile stations has been proposed in the prior art (U.S. Pat. No. 7,187,934), such steering of mobile stations results from adjustment of antenna parameters and is thus a trial and error process with unpredictable results. The present inventors devised a system that enables monitoring of idle mobile stations of a cell by actively querying the radio access network for information relating to a parameter or parameters characterizing the idle mobile stations. The present system utilizes the communication conduit present between the radio access controller and the core network to send a signal to the radio access network and capture a corresponding return signal from the switching data communicated from the radio access controller to the core network. By using signal analysis algorithms, the present system can analyze the return signal and derive information relating to device specific parameters as well as alter network parameters in order to maximize network load capacity, enhance service and the like.

The present invention will now be described in more detail starting with a description of a cellular network and its operation as illustrated in FIGS. 1-8B.

Figure 1:
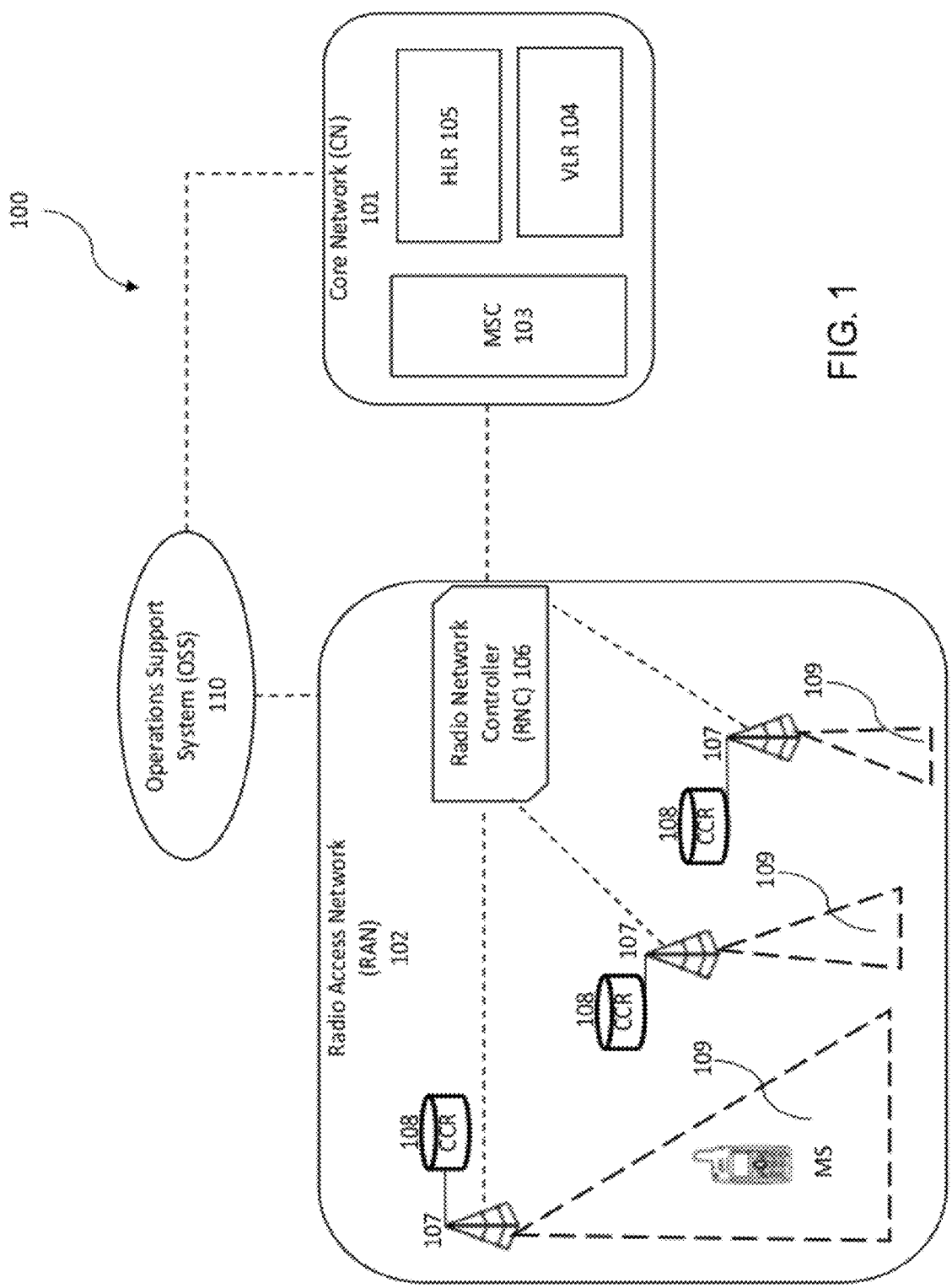
FIG. 1 shows a cellular telecommunications network.

Terminology:

Active MS The state which mobile stations are in bi-directional communication session with their host network ARSS Absolute Reception Signal Strength—an absolute measurement which depends on a passive mobile station's location in its camping cell, its location in a building, RF interference, and the like. UMTS systems calculate ARSS by the function $E_c/N_0$ in dB or RSCP in dBm BCC Best Camping Cell—A procedure employed by the CCD mechanism to find the best cell for camping Camping Cell The cell that will be used for initiating communication with/from a mobile station CCCM module Camping Cell Configuration Manipulation module—NOS module employed to reconfigure new cell configuration information for a selected cell CCD simulator Client installed on a mobile station which operates in a similar manner as its native CCD mechanism and can receive instructions from the CCCM module CCI Cell Configuration Information in the CCR CCT Cell Camping Threshold—A threshold that is broadcasted from a cell to all the passive mobile stations camped on the cell for defining the threshold for camping on the cell. Threshold could be, for example, received signal quality/strength from camping cell CCR Cell Configuration Register—each cell has a CCR for storing cell configuration information MS Mobile Station—Mobile Communication Device Native CCD Mobile stations are pre-installed with a native Camping Cell Determination (CCD) mechanism for periodically determining a preferred camping cell from two or more available camping cells for receiving service in their passive state NOA module Network Operations Analytics module—NOS module for processing uploaded reporting events for determining network operations metrics and providing information regarding one or more mobile stations NOS Network Operations System for obtaining Radio Access Network (RAN) information from passive mobile stations for monitoring, analyzing and optionally providing fixes to the operation of a cellular telecommunications network Passive MS Default state of mobile stations in which they are in reception mode only PMS Segmentation Passive Mobile Station Segmentation—A type of RAN information for determining reception signal strength by passive mobile stations camping on a selected cell RA Registration Area—an area in which mobile stations may roam without a need to perform location registration. Important for assisting the core network to route incoming services to mobile stations REA module Reporting Event Acquisition module—NOS module for capturing uploaded reporting events RM Reporting Mode—The state in which mobile stations are required to upload reporting events under certain circumstances RRSS Relative Reception Signal Strength—a relative measurement between a selected cell and one or more of its neighboring cells Serving Cell Cell used for bi-directional communication SCC Suitable Camping Cell—A procedure employed by the CCD mechanism to filter out cells that cannot provide a predetermined Quality Of Service (QOS) and are therefore deemed unsuitable FIG. 1 shows a basic scheme of cellular telecommunications network 100 broadly divided into a Core Network (CN) 101 and a Radio Access Network (RAN) 102 connected to the core network 101 by an interface, for example, UMTS Iu interface. The core network 101 includes the following core network entities: Mobile Switching Center (MSC) 103, Visitor Location Register (VLR) 104 and Home Location Register (HLR) 105. The RAN 102 includes a Radio Network Controller (RNC) 106 connected to cell antennas 107 by an interface, for example, UMTS Iub interface.

Each cell antenna 107 includes a Cell Configuration Register (CCR) 108 for determining its configuration for providing service to mobile stations camped in its cell 109. The CCRs 108 enable network operators to create a different cell configuration for each cell 109 based on the needs in the service area of the cell. Some Cell Configuration Information (CCI) influence the camping MS, SCC and BCC procedure, other CCI can control the cell broadcast message sent be the cell to all camping MS, for various uses like commercial and security uses.

The network 100 includes an Operations Support and System (OSS) 110 connected to the network entities for assisting in managing the network operation. The OSS 110 supports several functions, such as fault detection, performance, security, configuration etc.

FIG. 2A shows a Cell Configuration Register (CCR) 108 listing some typical

Cell Configuration Information (CCI) used in cellular telecommunications networks. CCRs 108 are primarily controlled by the RNC 106 and OSS 110. CCI typically includes inter alia Cell Identifier for cell identification by mobile stations; Registration Area for indicating assignment of cells to a group of cells or a service area for more efficient routing of communication to mobile stations; camping cell thresholds for determining whether mobile stations can camp thereon; and radio configuration for configuring various aspects of a cell's radio component.

FIG. 2B shows an UTMS CCR 108 with exemplary UTMS specified parameters, for example, the Cell ID for the Cell Identifier parameter; and Location Area Code (LAC) for the Registration Area parameter. Camping cell thresholds include inter alia Qrxlevmin, and Qqualmin which specify the minimum required reception level and quality level, respectively, for camping on a cell, Qoffset which specifies the offset between two cells for cell reselection.

Classification of Mobile Stations

Mobile stations that are powered on are classified as being in one of two operative states as follows:

"passive" or "idle" state meaning that a mobile station is not actively participating in a communication session and therefore not requiring network resources. Mobile stations in a passive state are hereinafter referred to as passive/idle mobile stations or passive/idle MS.

"active" state meaning that a mobile station is actively participating in a communication session and therefore requiring network resources. Mobile stations in an active state are hereinafter referred to as active mobile stations or active MS. Other common terms in the art refer to connected or dedicated mode.

Operation of Passive Mobile Stations

Passive mobile stations monitor network radio channels and periodically perform certain housekeeping routines to assist locating available resources for establishing active communication sessions. The housekeeping routines include:

1. Operating the CCD mechanism for periodically determining a preferred cell from two or more available cells for camping purposes, namely, for receiving service. Exemplary CCD mechanisms include inter alia GSM Cell Selection and Reselection, UMTS Cell Selection and Reselection, and the like.
2. Listening for paging messages.
3. Performing registration updates when necessary. Exemplary registration updates include inter alia UMTS location area code update, and the like.

The network 100 is unaware on which cells passive mobile stations are camped on and cannot interfere or influence the camping of specific mobile stations.

Operation of Active Mobile Stations

The RAN 102 controls active mobile stations. The RAN 102 orders each active mobile station from what cell or cells it should receive service. Additionally, the RAN 102 instructs each active mobile station to perform measurements on cells selected by the RAN 102. The measurements are sent as measurement reports to the RAN 102 for processing by various network elements such as RNC in a UMTS network. The measurement reports sent by active mobile stations are crucial for successful execution of communication sessions. The measurement reports provides the RAN 102 with various parameters such as, and without intention of being limited in any way, the reception signal strength of a serving cell and its neighbor cells.

Active mobile stations can additionally send event reports regarding certain events which occurred during an active communication session. One type of event is when a mobile station found a cell that can provide better service than the cell it is presently receives service from. Another type of event is when a mobile station detects that the strength of the receiving signal from its one or more serving cells is below a certain threshold. Such information assists a RAN to determine the best way to serve its mobile stations in terms of allocating more resources, adjusting the mobile station transmission power, to execute handovers or handoffs between cells, and the like.

Camping Cell Determination (CCD) Mechanism

Figure 3:
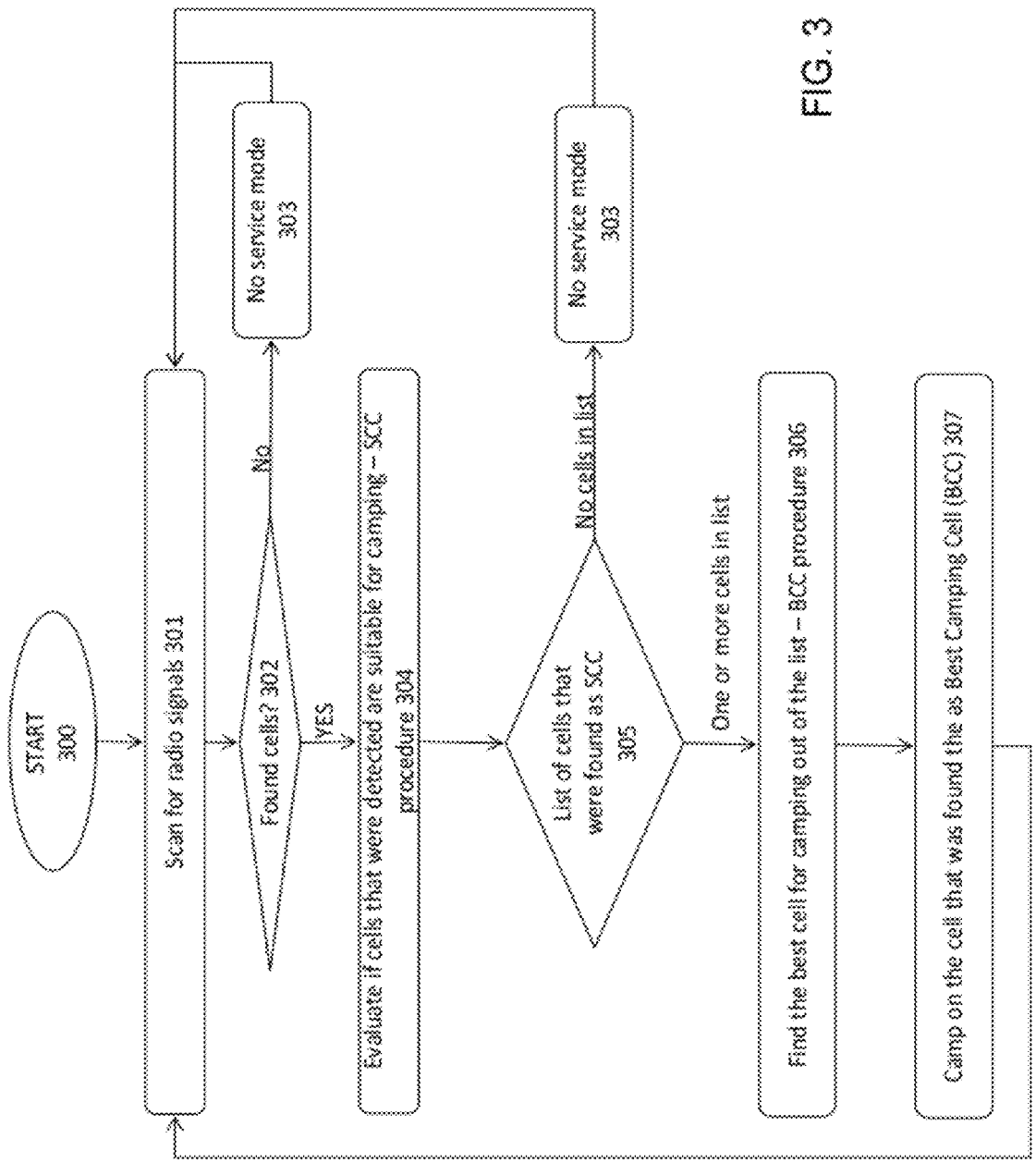
FIG. 3 shows a flow chart illustrating the operation of a Camping Cell Determination (CCD) mechanism for determining the camping cell of a passive mobile station.

FIG. 3 shows a flow chart illustrating the operation of a CCD mechanism for maintaining a mobile station camped on the best available cell. If the mobile station moves and or the network conditions change, it may be necessary for the mobile station to change the cell it is camped on. In normal cases when mobile stations are in passive mode, the mobile stations monitor several cells and information sent on broadcast channels that include vital information such as, and without intention of being limited in any way, paging information, system information and performance of cell measurements. This process is performed periodically at short time intervals.

UMTS Technical Standard 3GPP TS-25.304 entitled "User Equipment (UE) procedures in idle mode and procedures for cell reselection in connected mode" implements a CCD mechanism.

The steps of the CCD mechanism are as follows:

Step 301: MS scans for radio signals of network cells.

Step 302: If MS does not find one or more cells, it enters no service mode 303, and the end user is unable to receive cellular service. If MS finds one or more cells, MS continues to find the best cell for camping and continues to Step 304.

Step 304: MS employs a Suitable Camping Cell (SCC) procedure to evaluate each detected cell to filter out cells that cannot provide a predetermined Quality Of Service (QOS) and are therefore deemed unsuitable. The SCC procedure is known as Cell Selection in UMTS.

Step 305: If no cells pass the SCC procedure, the MS enters no service mode 303 otherwise the MS continues to Step 306.

Step 306: MS employs a Best Camping Cell (BCC) procedure to re-evaluate all the cells that were found suitable for camping to find the best cell for camping. The evaluation process includes using signal measurements, and information broadcasted from each cell for that purpose. The BCC procedure is known as Cell Reselection in UMTS.

Step 307: MS camps on the cell that was found the best for camping.

Registration Area Update Procedure

Cellular communication standards have defined a so-called Registration Area Update (RAU) Event in order to receive the current Registration Area (RA) of all passive and active mobile stations to assist networks in routing communication thereto. RAU Events can be triggered in three modes as follows:

Normal RAU: RAU events automatically triggered when a mobile station decided to camp on a cell in a different RA from its previous camping cell.

Periodic RAU: RAU events automatically triggered by a timing mechanism embedded in mobile stations. The timing mechanism is set by a network and a RAU update is triggered when the predetermined time expires. The timing mechanism is automatically reset to its maximum duration each time a mobile station becomes active.

Attach/detach RAU: RAU events automatically triggered when mobile stations are switched on and off. Switching on triggers an attach RAU event. Switching off triggers a detach RAU event.

In UMTS and GSM system, the RAU is also known as a Location Area Code (LAC) update and Routing Area Code (RAC) update.

Figure 4:
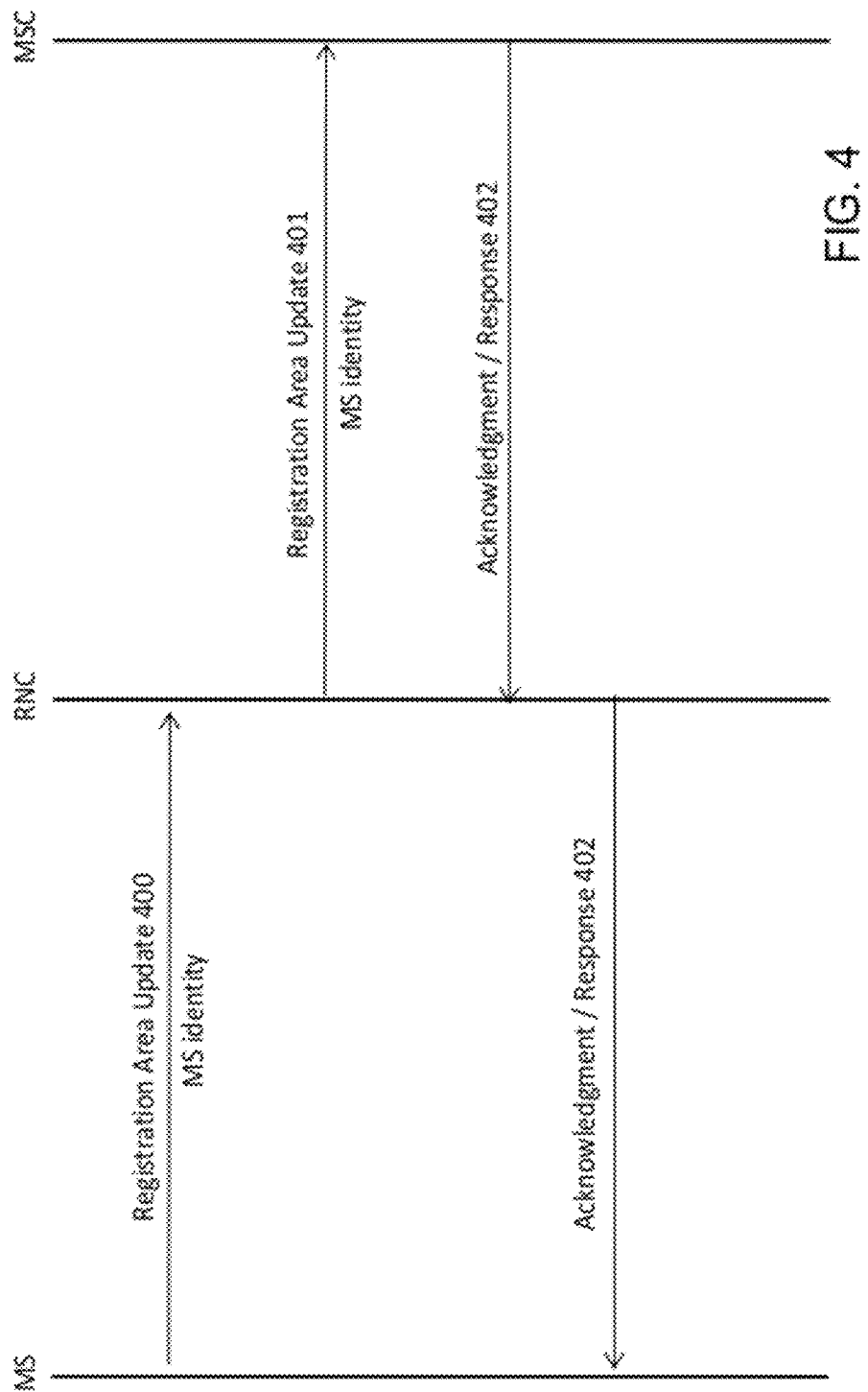
FIG. 4 shows an event diagram illustrating a simplified MS initiated Registration Area update procedure.

FIG. 4 shows an event diagram for the MS initiated RAU procedure triggered by any one of the three Normal, Periodic, Attach/detach RAU events. The flow of the event diagram is as follows:

Step 400: The MS sends RAU request to the RNC 106. The RAU request includes the new RA identity and the previous RA identity in case of a normal RAU. The RAU request also specifies the type of event which triggered the update request and the MS identity.

Step 401: The RNC 106 forwards the RAU request to the MSC 103 with the MS identity.

Step 402: The MSC 103 sends a RAU Accept/Reject message 402 to the RNC 106 addressed to the identity specified in the RAU request message.

Step 403: The RNC 106 sends the RAU accept/reject message to the requesting MS.

Figure 5:
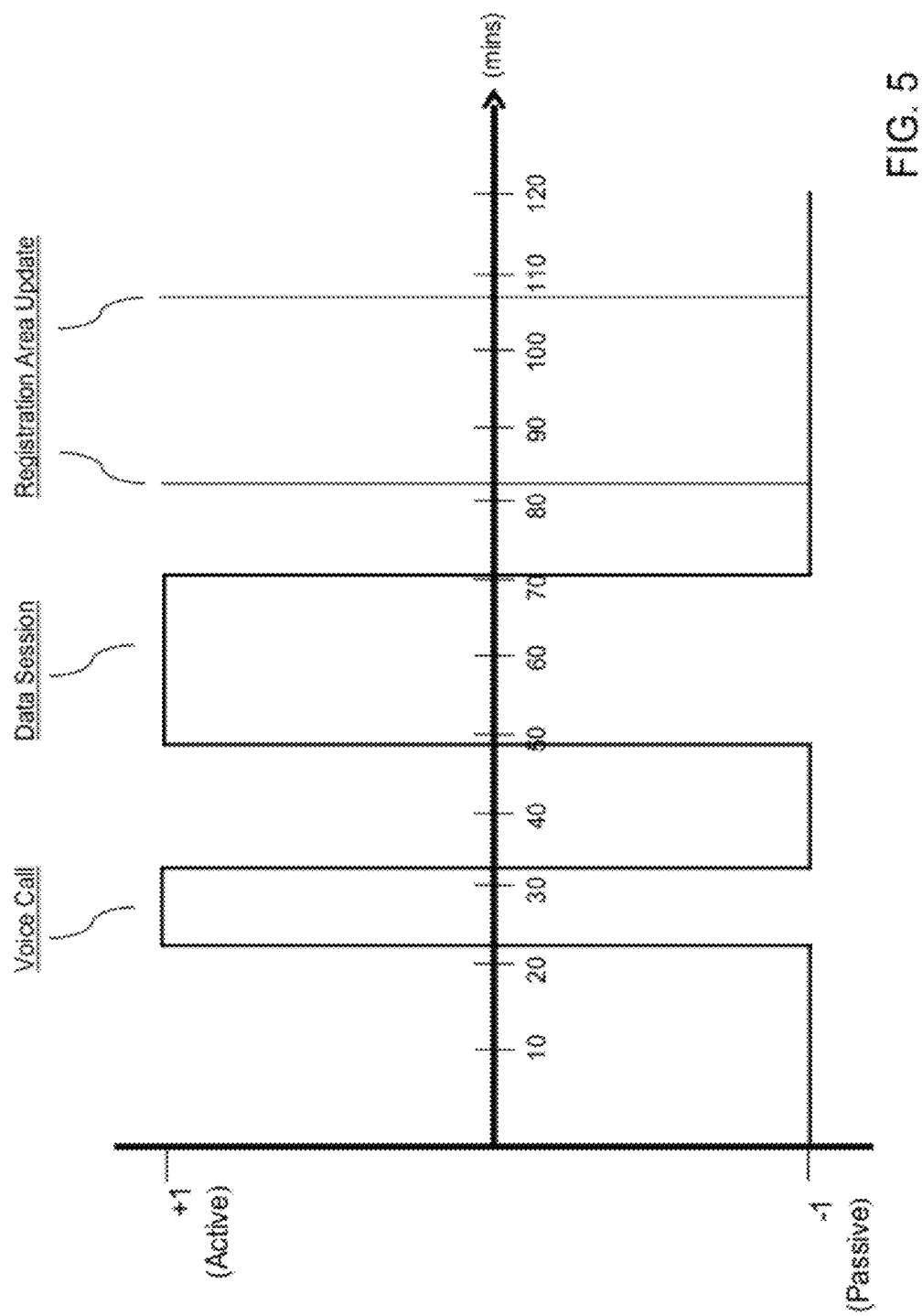
FIG. 5 shows a graphic timeline representation of the operation of a mobile station switching between its active state and its passive state.

FIG. 5 shows a timeline graphic representation of the operation of a mobile station switching between its active mode represented by +1 and its passive mode represented by −1. The mobile station remains in its default passive mode except such times that it engages in communication sessions, for example, a voice call, a data session, and when executing Registration Area Update (RAU) events. RAU events are typically very short communication sessions only lasting a few seconds.

Figure 6:
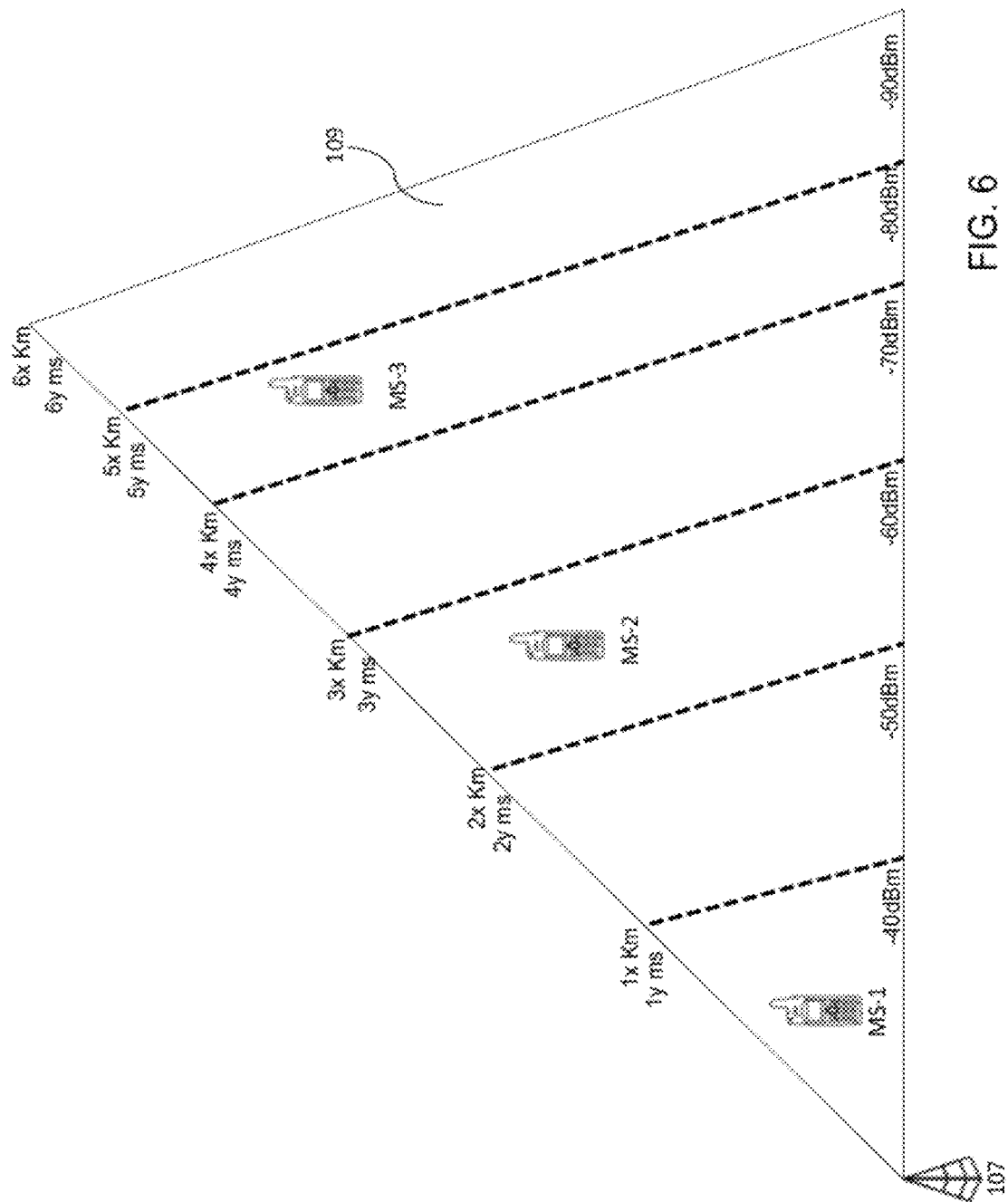
FIG. 6 shows a graphic representation of theoretical reception signal strength spreading from a cell antenna.

FIG. 6 illustrates a cell antenna 107 broadcasting a radio signal across a flat cell 109 and shows the theoretical linear relationship between signal strength, MS Response Time and the distance from the cell antenna 107. In the case that the cell 109 has a minimum Camping Cell Threshold (CCT) of −110 dBm, then all three passive mobile stations MS-1, MS-2 and MS-3 will camp on the cell and can receive service in their active state. Setting the cell's CCT to −70 dBm causes the mobile station MS-3 to stop camping on the cell. Similarly, setting the cell's CCT to −50 dBm causes the mobile station MS-2 to stop camping on the cell. Nowadays, all major standards design the SCC and BCC procedure to relay only on the radio signal strength/quality. Future standards might design the MS, SCC and/or BCC procedures to relay on Signal Time Response, distance between the MS and cell and other parameters. Future standard might also define various CCT parameters like Time Response Threshold and distance threshold and the like. The example given above is also true in cases where the CCT parameter will not be of radio strength/quality, but based on signal time response, distance or any other parameter.

Figure 7:
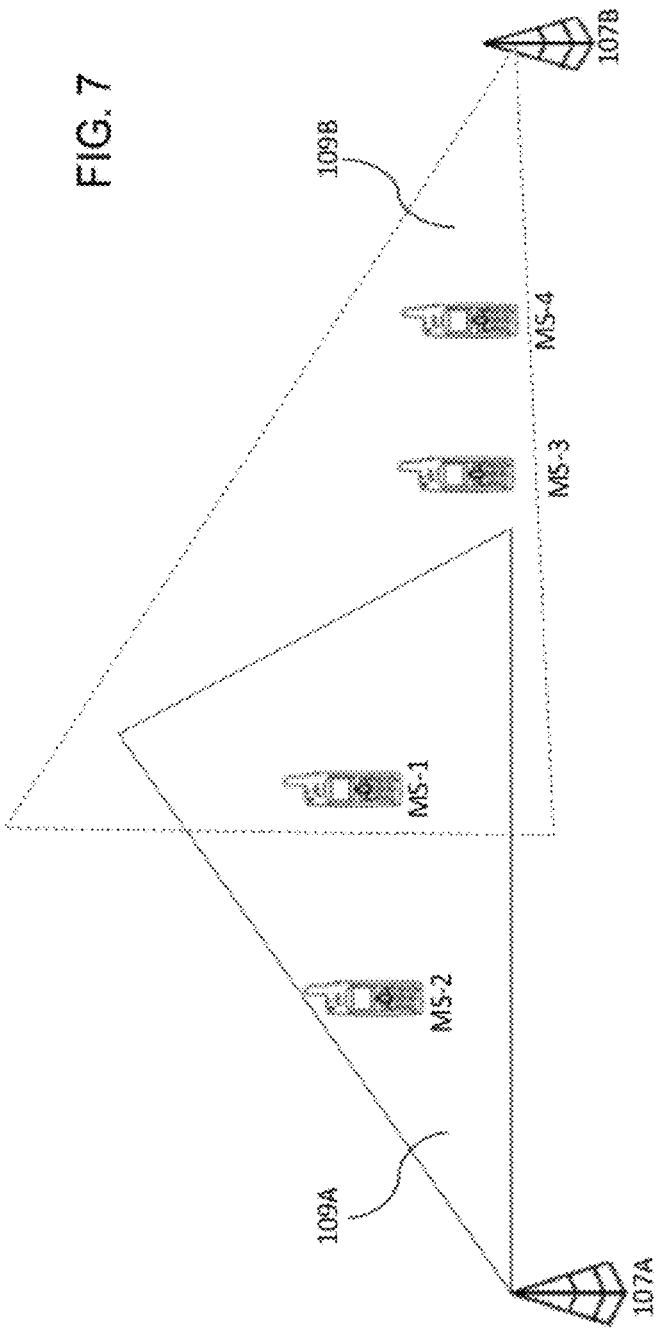
FIG. 7 shows an initial state of four mobile stations camped on two overlapping cells assigned to different Registration Areas.
Figure 8B:
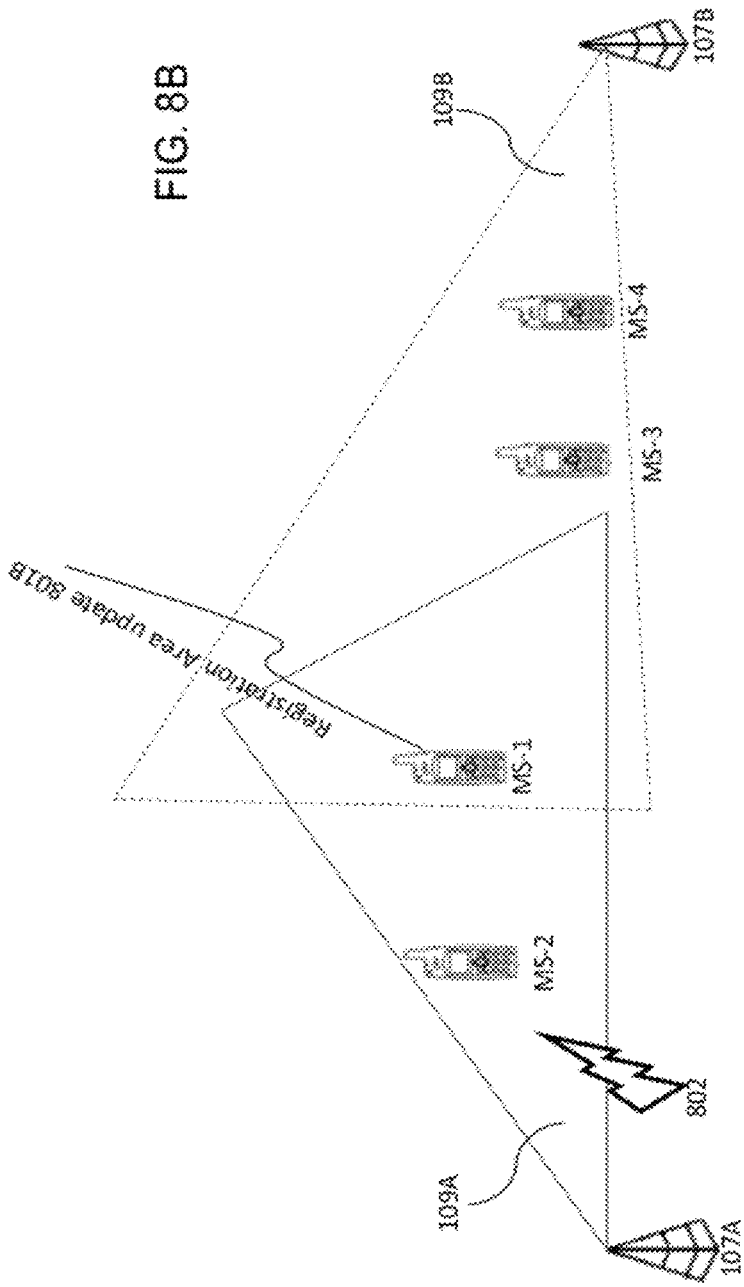
FIG. 8B shows a later state of FIG. 7's four mobile stations pursuant to one of the mobile stations having moved to a new cell for camping purposes as a result of a radio disturbance that lowered the signal quality from previous camping cell.

FIGS. 7 and 8A/B show four mobile stations MS-1, MS-2, MS-3 and MS-4 camping on two overlapping cells 109A and 109B. Cell 109A is assigned to RA 1111. Cell 109B is assigned to RA 2222. FIG. 7 shows the mobile stations MS-1 and MS-2 camping on cell 109A and mobile stations MS-3 and MS-4 camping on cell 109B including the measured signal strength from each cell. FIG. 8A shows the mobile station MS-1 physically moving out of the coverage area of cell 109A to the coverage area of cell 109B whereupon it moves to camp on cell 109B and issues a Normal RAU event. FIG. 8B shows the mobile station MS-1 moves to camp on cell 109B as a result of a radio disturbance 802 present in the coverage area of cell 109A causing a worsening in received signal strength of cell 109A, thus MS-1 moves to camp on cell 109B which has better signal strength. Upon cell reselection MS-1 issues a Normal RAU event. A radio disturbance could be some kind of physical of electromagnetic broadcast that cause interference to the radio transmission from the cell.

FIGS. 9-22B illustrate the present invention and exemplary applications thereof.

Figure 9:
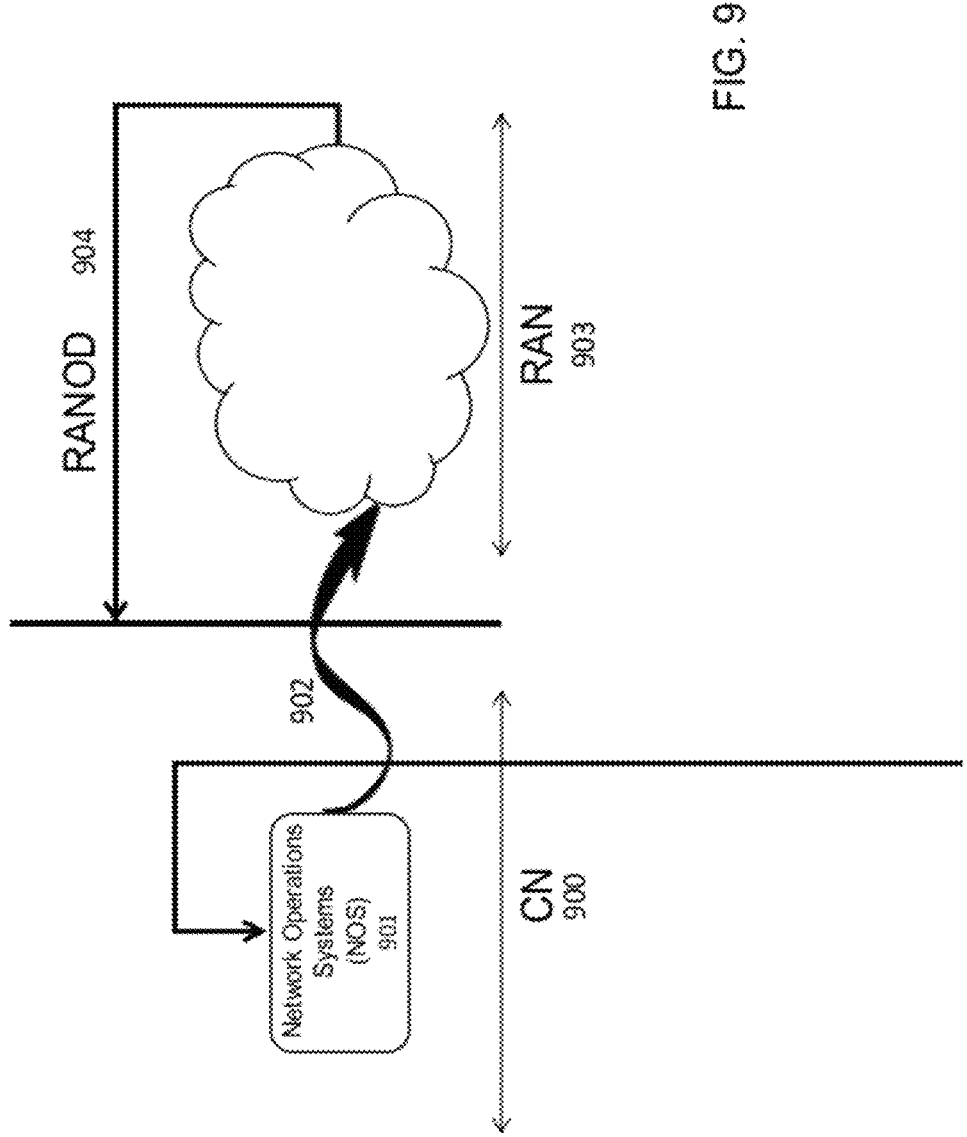
FIG. 9 shows a high-level schematic illustration of the NOS operation.

FIG. 9 illustrates the concept underlying the operation of the present system which is referred to herein as Network operations system (NOS) 901.

NOS 901 can be implemented as a Mobile Station (MS) manipulating NOS or a client assisted NOS.

Mobile Station (MS) manipulating NOS is exemplified by the configuration illustrated in FIG. 13 which is described in greater detail hereinbelow.

Client assisted NOS is exemplified by the configuration illustrated in FIG. 16 which is described in greater detail hereinbelow.

Regardless of the configuration used, Network Operations System (NOS) 901 sends at least one signal including a triggering event 902 to the RAN 903. The Triggering event 902 is directed to a specific cell of the RAN 903 and contains a certain CCT and its value.

Triggering event 902 is designed to elicit a defined response from RAN 903 and thus includes signal information that will cause MS camping on triggered cell to reevaluate if to continue camping on the cell or move to different cell and provide a signaling indication of such move to the Core Network.

Triggering event 902 activates any MS (not shown in FIG. 9) camping on the triggered cell that are not in compliance with the CCT. Compliance of MS with a CCT of a cell the MS are camped on depends upon the potential reception of the radio antenna signal which can be affected by the power, tilt, azimuth or any other physical property of the antenna.

The activated MS then transmit RAN Oriented Data (RANOD) to RAN 903. This data includes, for example, messages that RAN 903 receives from the MS and uses to provide adequate radio services that allow MS to communicate with each other and other devices.

Mobile stations also transmit information that is not related to radio services (905), such information includes, for example, messages that the CN receives from RAN 903 for routing of services, such as UMTS LAC update and RAC update and call and session switching. RAN 903 receives all data transmitted by the MS, but only forwards the non-related radio information 905 to the CN 900. NOS 901 then collect non-related radio information 905 from the network at a higher level of hierarchy than RAN 903; for example through the Core Network, a Public Network via SMS or a web site.

Non-related radio information 905 includes data generated by triggering event 902 which data includes LAC/RAC updates. Thus, by communicating triggering event 902 to RAN 903 and collecting non-related radio information 905 from the network, NOS 901 can acquire RAN 903 information.

The information derived from triggering event 902 can be used to determine various RAN information which is derived from passive MS camping on a triggered cell. Such RAN information can be, for example, the signal strength/quality, MS response time, MS distance from cell.

RAN information obtained from the triggering event 902 can be used to perform the following:

(i) Analyze Cell Quality of Service (QOS): When NOS operates on any given network cell, utilizing radio strength/quality CCT parameters, it will produce a coverage map, indicating the overall signal strength/quality that is received by MS camping on a certain cell and optionally from neighboring cells. Such results can indicate whether a cell provides good service to camping subscribers or not.

(ii) Analyze MS received QOS: The NOS could also operate on a certain cell because of an MS camping on it. Since the NOS operates on all passive MS camping on cell and not on a single MS, it is possible to compare the perceived RAN information (such as signal strength/quality of the camping cell and optionally neighboring cells) of the inspected MS with respect to all other MS camping on the same cell. Such results can indicate whether the MS received bad QOS while other MS in the same camping cells do not, therefore, suggesting a high probability for faulty a MS.

(iii) Calculate MS estimated location: When NOS operates on any given cell utilizing radio strength/quality CCT parameters, the end result will be a list of subscribers camping on the cell, and the received signal strength/quality of the cell and optionally of neighboring cells. Such information can be used to estimate the geographical location of each MS.

(iv) Create a Cell Relation Matrix (CRM)—NOS can identify a radio overlap between any two cells. By utilizing vectored CCT parameters it is possible to require MS not compiling with CCT parameter to change their camping cell to a specific neighboring cell. In case where MS move from the original tested cell to the designated neighbor cell, this indicates that a radio signal overlap exists between the two cells. Additionally the signal strength/quality of the neighboring cell could be inferred by the NOS as explained before. Furthermore, since the total number of MS camping on the cell, as well as the number of MS that could receive service from the neighbor cell are known to the NOS, the strength or weight of the overlap could be calculated.

Several application could use the CRM to allow rapid, accurate and reliable results then other systems:

i. Load Balancing: When cell resources become overloaded, the traffic could be steered to neighboring cells. The CRM enables the system to: know which neighboring cells are capable to offload traffic from the overloaded cell, and how much traffic could be steered to each neighbor while ensuring that a certain standard of QOS is maintained. Therefore it is possible to steer both idle subscribers from the overloaded cell, to suitable neighboring cells in the right proportion, therefore preventing future overload. Additionally the system could steer active MS to the best neighboring cell possible, taking into consideration the CRM data and the current load of neighboring cells.

ii. Energy Saving: During times where low traffic capacity are needed (such is the case at night time) some cells could be shutdown thus resulting in energy saving and decreased costs to network operator. Not every cell could be shut down because some are critical for supplying coverage and shutting those cell will create a coverage hole. Therefore, using the CRM the system could classify each cell as being coverage crucial or not. Therefore, when a low traffic demand occurs the system will shutdown cells that are not crucial for coverage, and will switch them on when traffic demand raises again.

iii. Neighbor List Optimization: Since the CRM provides a quantitative information about the signal overlap between two cells, the system can detect preconfigured neighboring cells in the neighboring list that are redundant and should be deleted from the neighboring list. Additionally the system will be able to find other cells that are not in the neighboring list but to overlap with the examined cell, and therefore should be added. An optimized neighboring list will decrease the amount of dropped calls and increase overall QOS and network resource utilization.

FIGS. 10-22B illustrate the operation of the present invention in more detail.

Figure 10:
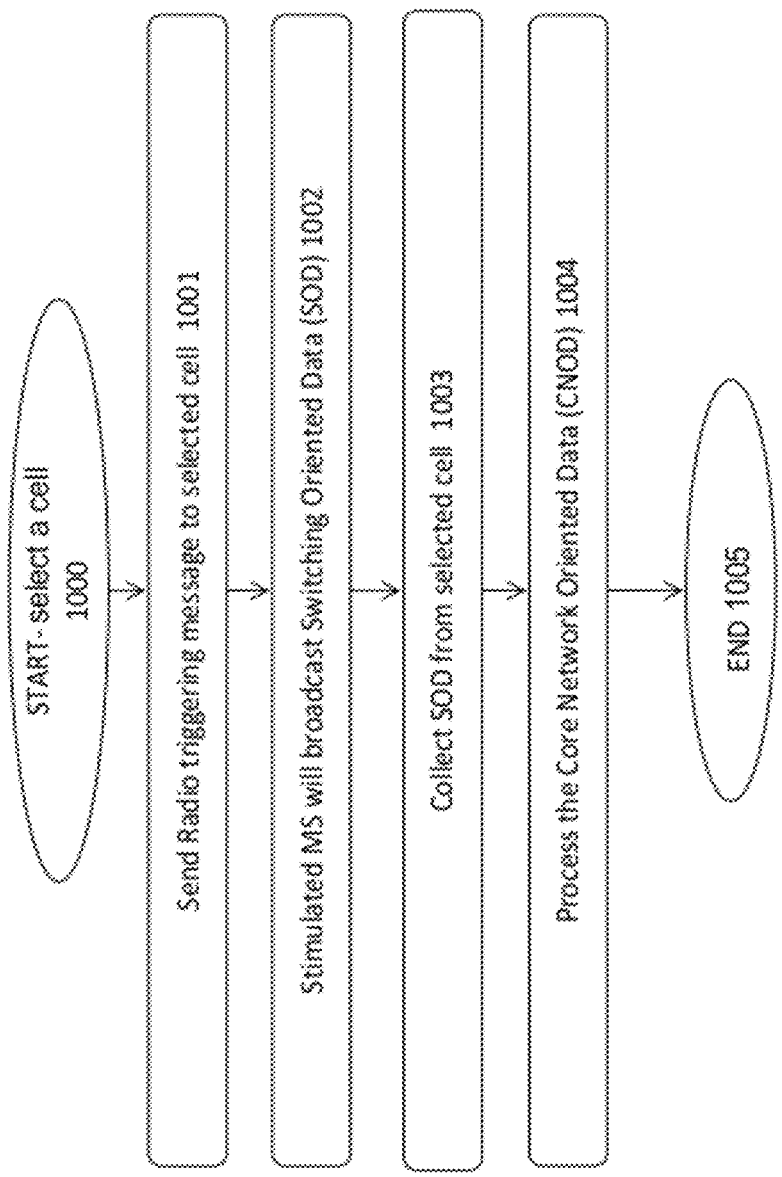
FIG. 10 shows a top level flow chart illustrating the operation of the NOS of the present invention.

FIG. 10 is a generalized flow chart illustrating the operation of NOS 901:

Step 1000: Select a cell for obtaining RAN information from the passive mobile stations camping on the selected cell Step 1001: Send Radio triggering messages to selected cell;

Step 1002: Activated MS will broadcast Switching Oriented Data (SOD)

Step 1003: Collect SOD from selected cell;

Step 1004: Convert Switching Oriented Data (SOD) to Radio Oriented Data (ROD)

Figure 11:
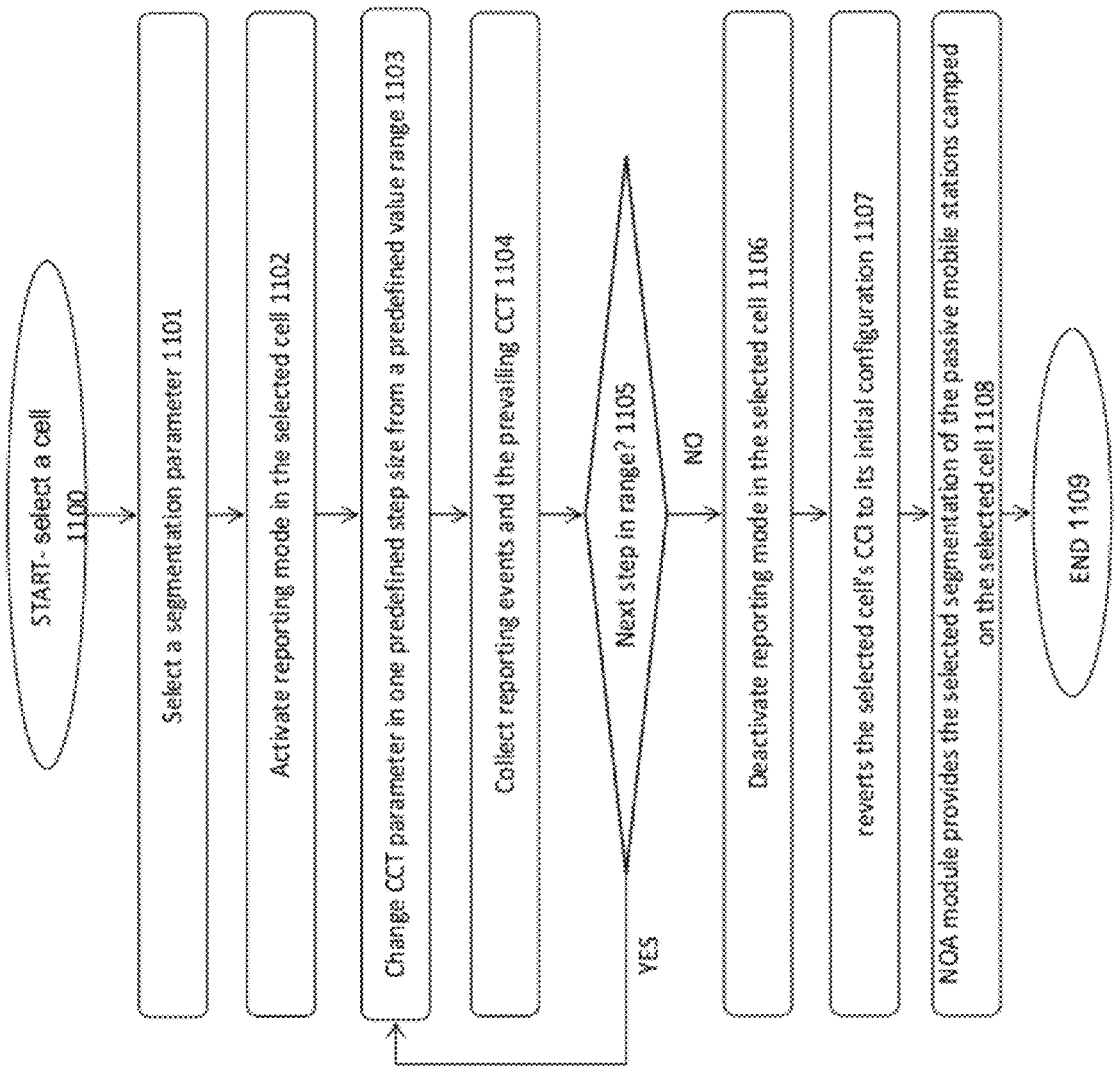
FIG. 11 shows a top level flowchart of the operation of the NOS for acquiring Passive Mobile Station (PMS) segmentation information in accordance with the present invention.

Step 1005: End;

FIG. 11 is a flow chart illustrating the operation of NOS 901 when acquiring passive mobile station segmentation information in a selected cell:

Step 1100: Select a cell for PMS segmentation purposes.

Step 1101: Select a segmentation parameter from the list of Absolute Reception Signal Strength (ARSS) segmentation, Relative Reception Signal Strength (RRSS) segmentation, and combined ARSS/RRSS segmentation. The segmentation parameter can be any CCT parameter including, but not limiting to, Absolute Reception Signal Strength (ARSS) such as UMTS Qrxlevmin, Qqualmin or Relative Reception Signal Strength (RRSS) such as UMTS Qoffset or any other thresholds such as max response time, max MS distance from cell, MS access class, number of perceived neighboring cells, etc.

Step 1102: CCCM module 1601 activates Reporting Mode in the selected cell.

Step 1103: CCCM module 1601 sets a new Camping Cell Threshold (CCT) for at least one camping cell parameter. The different PMS segmentation employs different CCT parameters. For example, ARSS segmentation employs Suitable Camping Cell (SCC) parameters; RRSS segmentation employs Best Camping Cell (BCC) parameters; and combined ARSS/RRSS segmentation employs both SCC and BCC.

Step 1104: REA module 1602 collects the reporting events and the prevailing CCT.

Step 1105: CCCM module 1601 increments or decrements the camping cell threshold to a new camping cell threshold.

Steps 1703 to Steps 1705 are repeated for a predetermined range of camping cell thresholds.

Step 1106: CCCM module 1601 deactivates the Reporting Mode in the cell.

Step 1107: CCCM module 1601 reverts the cell's CCI to its initial configuration.

Step 1108: NOA module 1603 provides the selected segmentation of the passive mobile stations camped on the selected cell.

Figure 12:
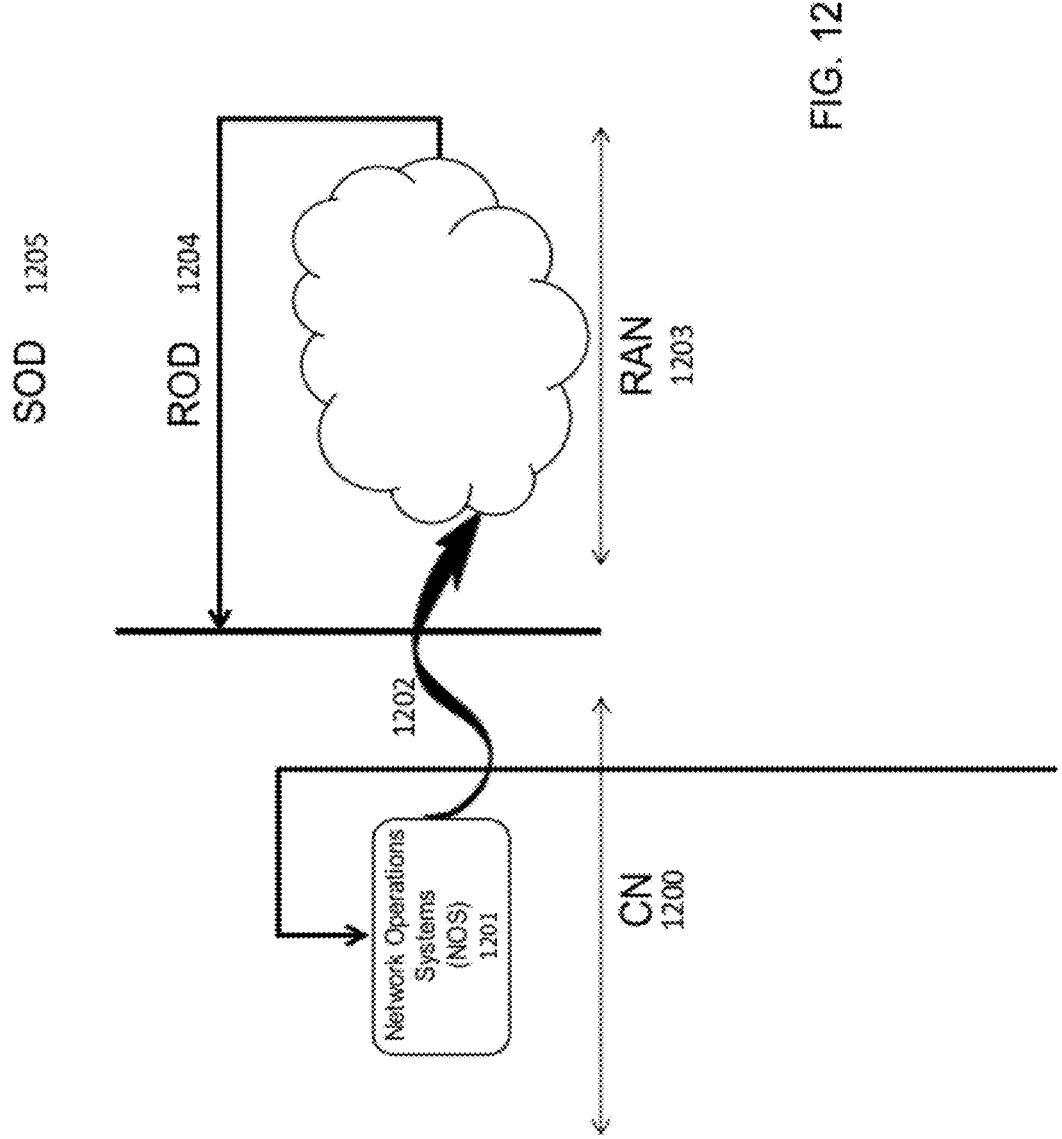
FIG. 12 shows a high-level schematic illustration of the operation of the Mobile Station (MS) manipulating Network Operations System (NOS) in accordance with a first preferred embodiment of the present invention.

FIG. 12 illustrates the operation of a Mobile Station (MS) manipulating Network Operations System (NOS) in accordance with a first preferred embodiment of the present invention. The Network Operations System (NOS) 1201 sends a triggering event 1202 through CN 1200 to RAN 1203. Triggering event 1202 is directed to a specific cell at RAN 1203 and contains a certain CCT and its value. The triggering event activates MS camping on the triggered cell that are not in compliance with the CCT. During the transmission, the MS transmit to the RAN 1203 Radio Oriented Data (ROD) 1204 which includes, for example, messages that the RAN 1203 receives from MS in order to provide radio services that will allow MS to communicate with each other and other devices. The MS also transmit Switching Oriented Data (SOD) 1205 that includes but is not limited to messages that the CN 1200 receives from MS that are needed for the routing of services, such as UMTS LAC update and RAC update. The RAN 1203 receives all data transmitted by the MS, but only forwards the SOD 1205 to the CN 1200. The NOS 1201 then collects the SOD 1205 from CN 1200, including its prevailing triggering message 1202, and thus can infer from the SOD 1205, ROD 1204.

Figure 13:
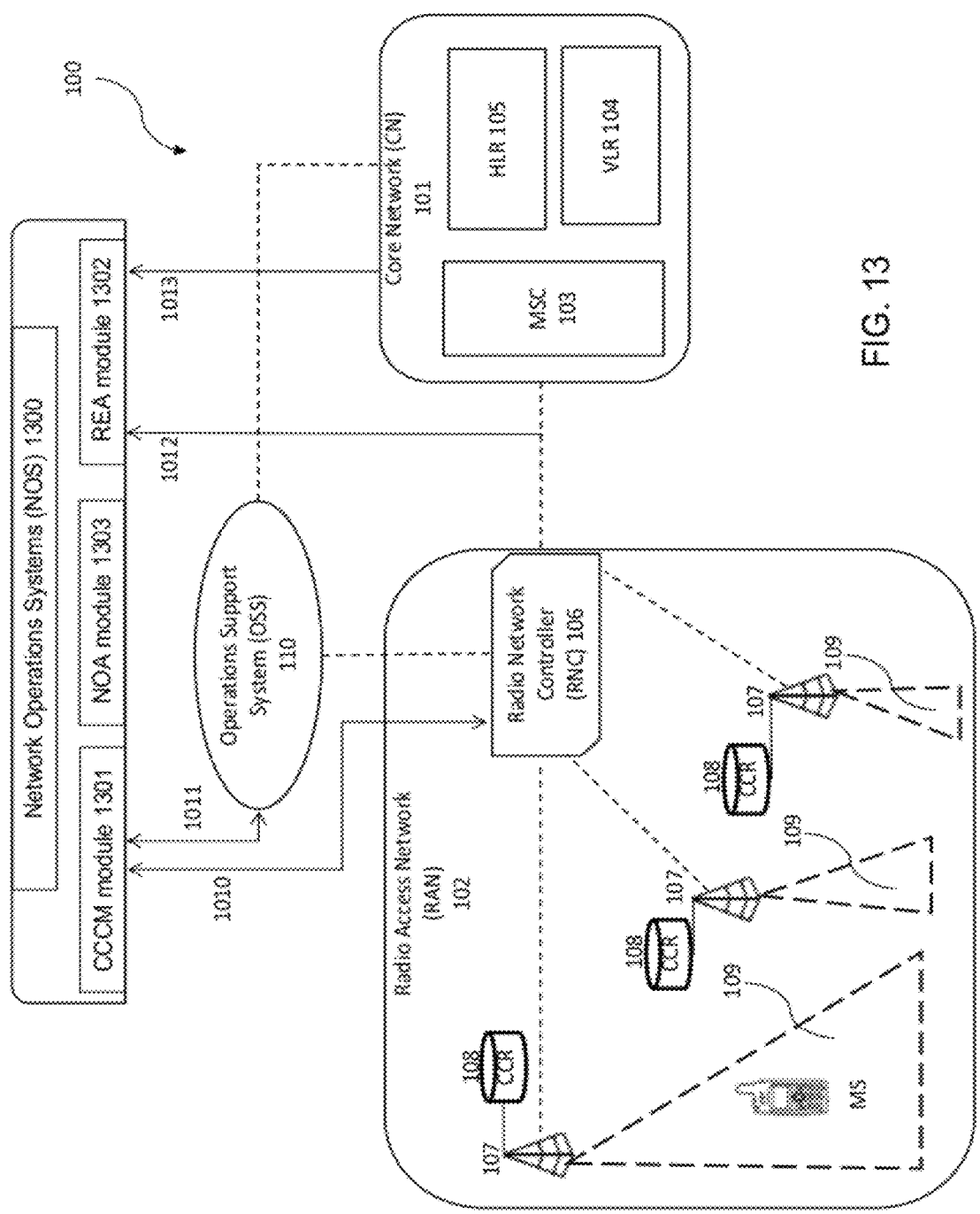
FIG. 13 shows a cellular telecommunications network including a Mobile Station (MS) manipulating Network Operations System (NOS) in accordance with a first preferred embodiment of the present invention.

FIG. 13 shows a Mobile Station (MS) manipulating NOS 1300 including three modules as follows: a Camping Cell Configuration Manipulation (CCCM) module 1301, a Reporting Event Acquisition (REA) module 1302, and a Network Operations Analytics (NOA) module 1303. The CCCM module 1301 interacts with network entities such as the RNC 106 and the OSS 110. The CCCM module 1301 is employed to reconfigure new cell configuration information (CCI) at the CCR 108 for a selected cell. The CCCM module changes Cell Camping Threshold (CCT) parameters that affect camping MS Camping Cell Determination (CCD) mechanism. Other CCI parameters used by the CCCM are used to switch mobile stations camped on the selected cell into a Reporting Mode (RM) for uploading reporting events under certain circumstances, for example, upon changing a selected camping cell. The REA module 1302 captures the reporting events and preferably is synchronized with the CCCM module 1301 so it is able to add the prevailing CCI to each reporting event and pass the information to the NOA module 1303. The REA module 1302 monitors several interfaces such as, in UMTS network, the Iu interface between the MSC 103 and the RNC 106.

The NOA module 1303 processes the uploaded Reporting Events and prevailing CCI for determining network operations metrics and providing information regarding one or more mobile stations or cells 109.

Figure 14:
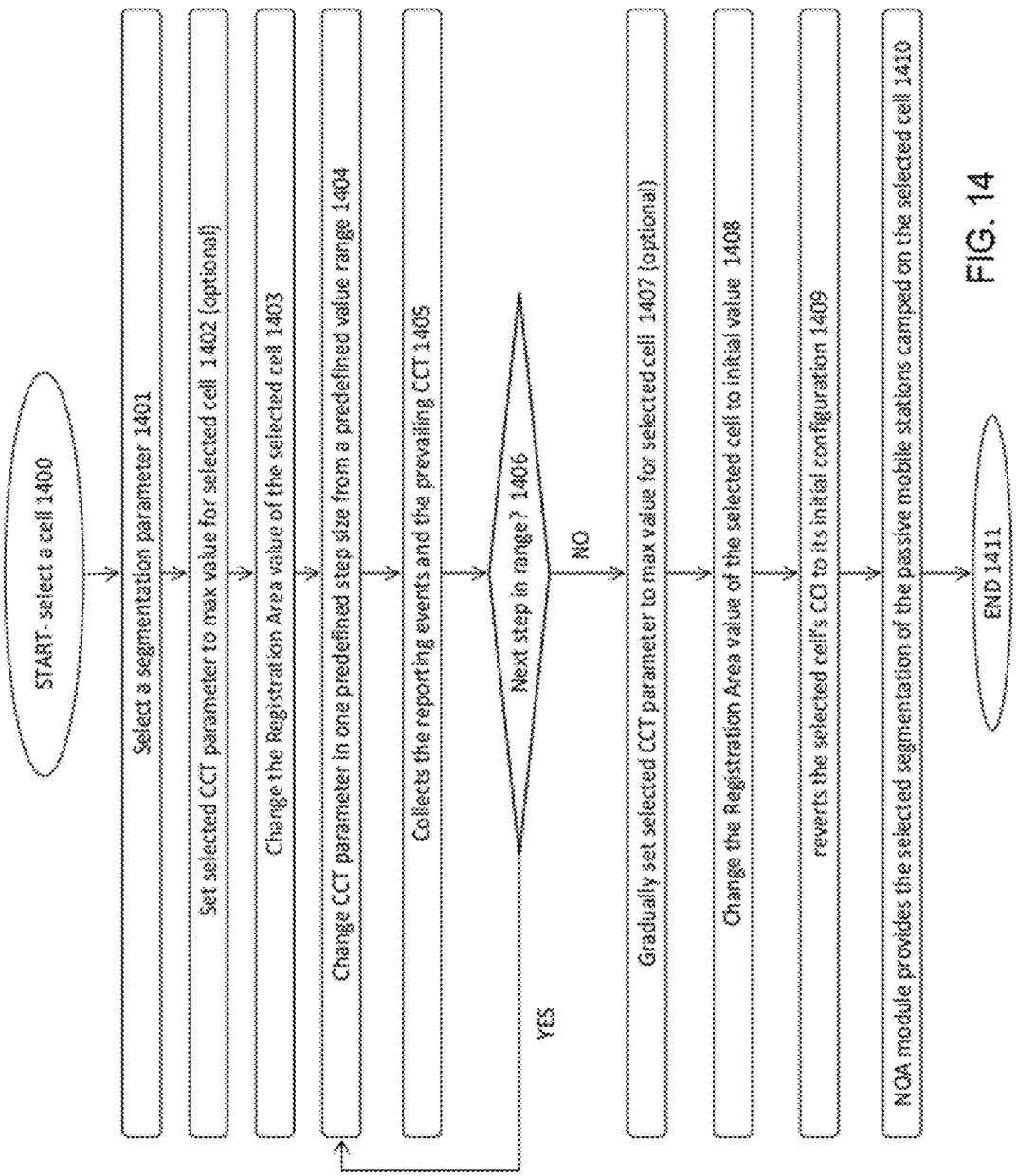
FIG. 14 shows a detailed flowchart of the operation of FIG. 12's MS manipulating NOS for acquiring PMS segmentation information.

FIG. 14 shows operation of the MS manipulating NOS 1300 for acquiring passive mobile station segmentation information:

Step 1400: Select a cell for PMS segmentation purposes.

Step 1401: Select a segmentation

Step 1402: Preferred optional step to avoid sudden traffic burst on a selected cell. Select a CCT parameter according to the selected segmentation type and set it to its maximum value for evacuating all the passive mobile stations camping on the selected cell.

Step 1403: CCCM module 1301 activates Reporting Mode in the selected cell by changing the value of its registration area parameter to a value which is not allocated to any one of its neighboring cells.

Step 1404: CCCM module 1301 sets a new camping cell threshold for at least one camping cell parameter. The different PMS segmentation types employ different parameters. For example, ARSS segmentation employs Suitable Camping Cell (SCC) parameters; RRSS segmentation employs Best Camping Cell (BCC) parameters; and combined ARSS/RRSS segmentation employs both SCC and BCC.

Step 1405: REA module 1302 collects the reporting events and the prevailing CCT.

Step 1406: CCCM module 1301 increments or decrements the camping cell threshold to a new camping cell threshold.

Steps 1404 to Steps 1406 are repeated for a predetermined range of camping cell thresholds.

Step 1407: Step 1402 is preferably repeated for the same reason.

Step 1408: CCCM module 1301 deactivates the Reporting Mode in the cell by reverting the value of its registration area parameter to its original value.

Step 1409: CCCM module 1301 reverts the cell's CCI to its initial configuration.

Step 1410: NOA module 1303 provides the selected segmentation of the passive mobile stations camped on the selected cell.

Figure 15:
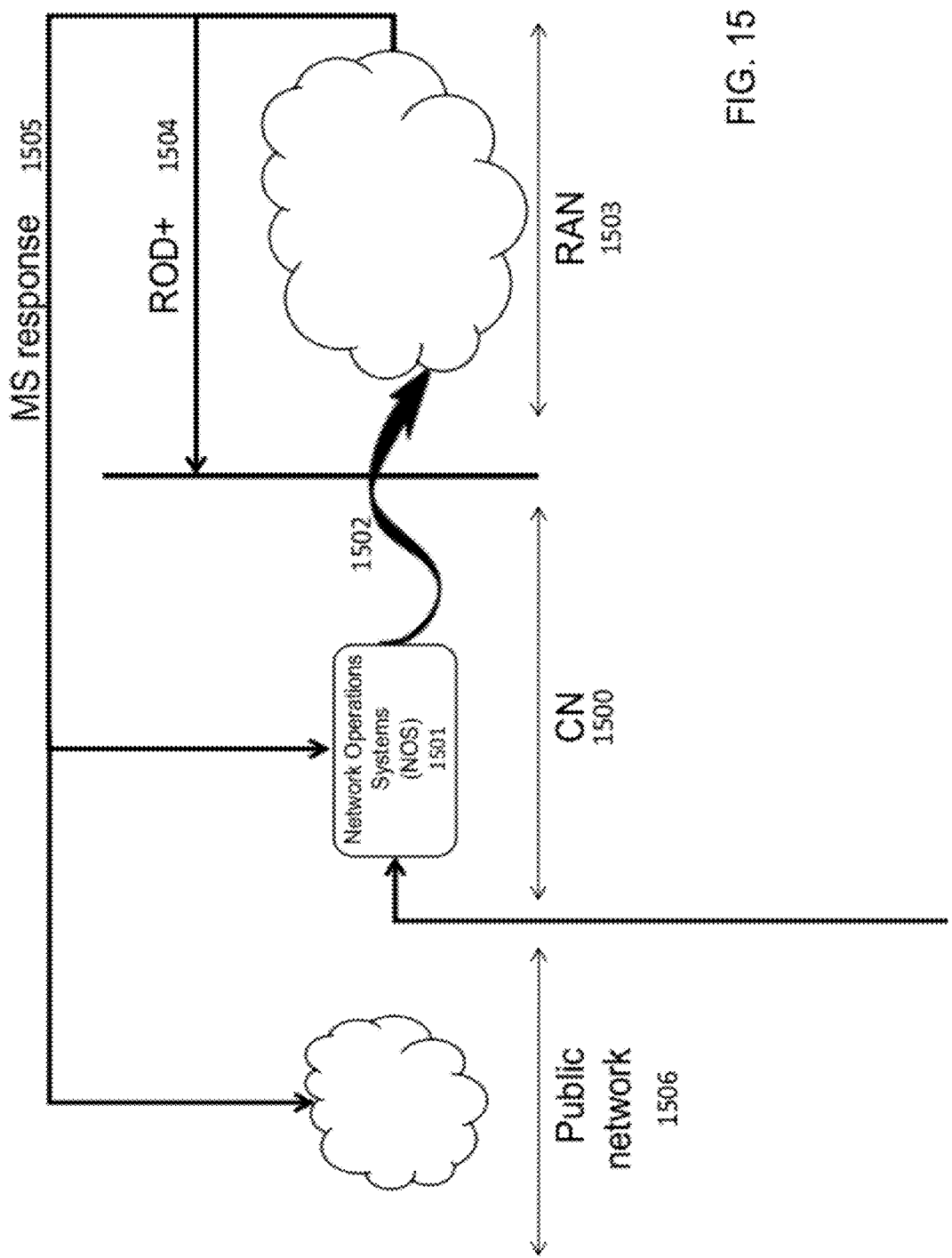
FIG. 15 shows a high-level schematic illustration of the operation of the client assisted Network Operations System (NOS) in accordance with a second preferred embodiment of the present invention.

FIG. 15 shows a high-level schematic illustration of the operation of the Client Assisted Network Operations System (NOS) in accordance with a first preferred embodiment of the present invention, wherein from the CN 1500 the Network Operations System (NOS) 1501 send a triggering event 1502 to the RAN 1503. The Triggering event 1502 is directed to a specific cell at the RAN 1503 and contains a certain CCT and its value. The triggering event 1502 causes MS camping on the triggered cell and that are not in compliance with the CCT to be stimulated and thus enter into active transmission. During the transmission the MS transmit to the RAN 1503, Radio Oriented Data (ROD) 1504 which includes but is not limited to all messages that the RAN 1503 receives from MS in order to provide MS with adequate radio services that will allow MS to communicate with each other and other devices. The MS also transmit a MS Response 1505 to the triggering. The MS Response 1505 could be, without intention to be limited to, SMS and MMS message, voice and video calls, data sessions and the like. The NOS then collects the MS Response 1505 either from the CN 1500 or some type of Public Network 1506, including its prevailing triggering message 1503. Optionally and preferably the MS Response 1505 will include supplementary data such as, the MS GPS coordinates and other localized data. From the MS Response 1505 and prevailing triggering message the NOS can infer RAN information.

Figure 16:
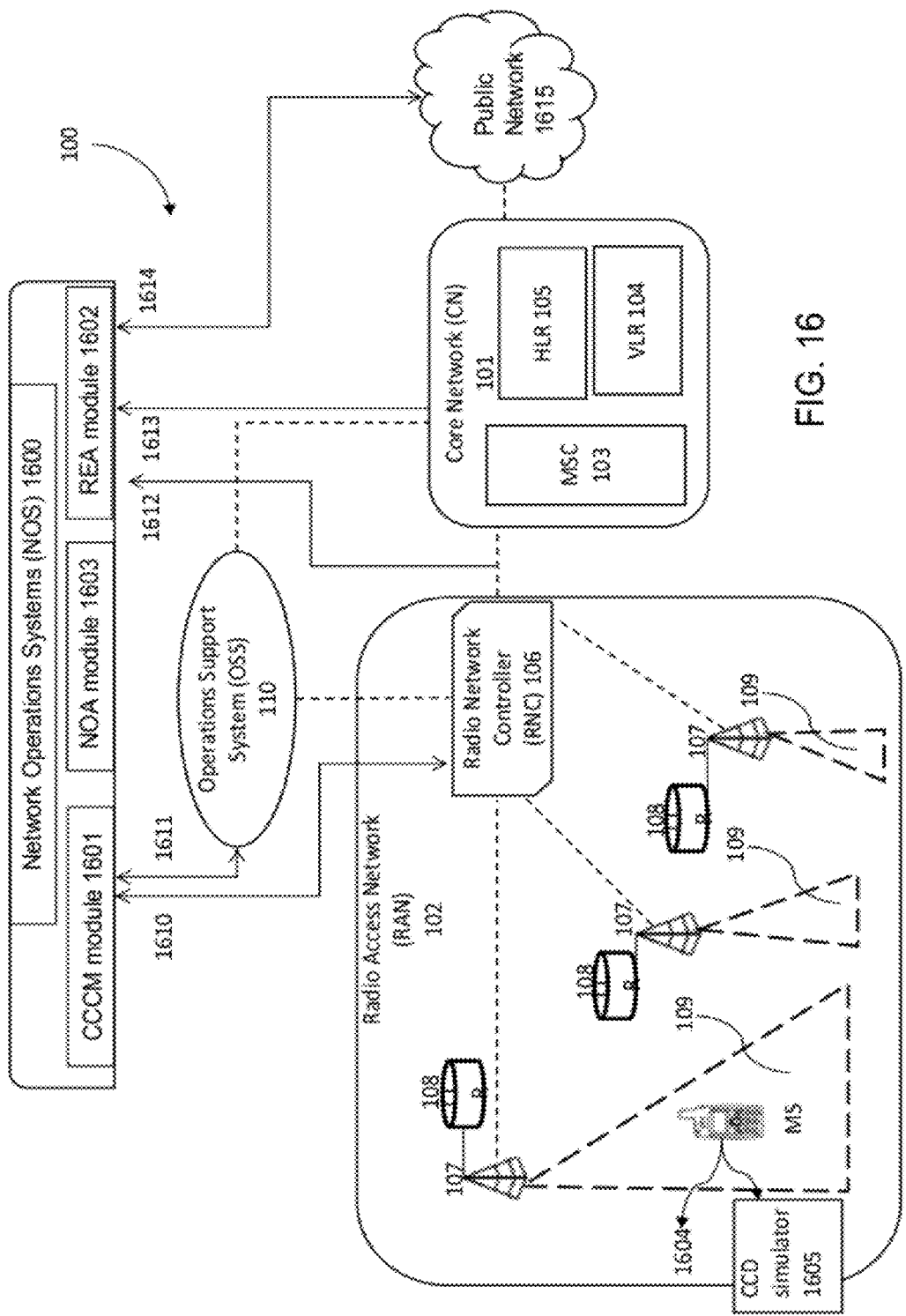
FIG. 16 shows a cellular telecommunications network including a client assisted Network Operations System (NOS) in accordance with a second preferred embodiment of the present invention.

FIG. 16 shows a client assisted Network Operations System 1600 similar to the NOS 1300 except that the former includes client module 1604 on at least some of the mobile stations. The client module 1604 is either hardware or software implemented and is configured to monitor predetermined broadcasting channels which are different from the network management channels. Suitable broadcasting channels include, for example, GSM cell broadcasting channels used for commercial purposes, and the like. In case of a software implementation, the client module can be a part of the MS operating system, or installed as third party software. The client module 1604 includes a CCD simulator 1605 which can interact with other MS modules such as the native CCD mechanism, and can access information regarding the camping and neighbor cells, such as cell identity, reception signal strength, registration area and the like. Additionally, the client module could access GPS coordinates if the devices has a GPS module. At this embodiment the CCCM module will not change CCT parameters but instead will change Cell Broadcast message, which are messages that each cell broadcast to all camping MS. Usually Cell Broadcast is used for commercial or security uses. This method has the benefit of not changing CCT parameters and thus not influencing the normal operation of the network, but requires installation of client side module along with a network side system.

Figure 17:
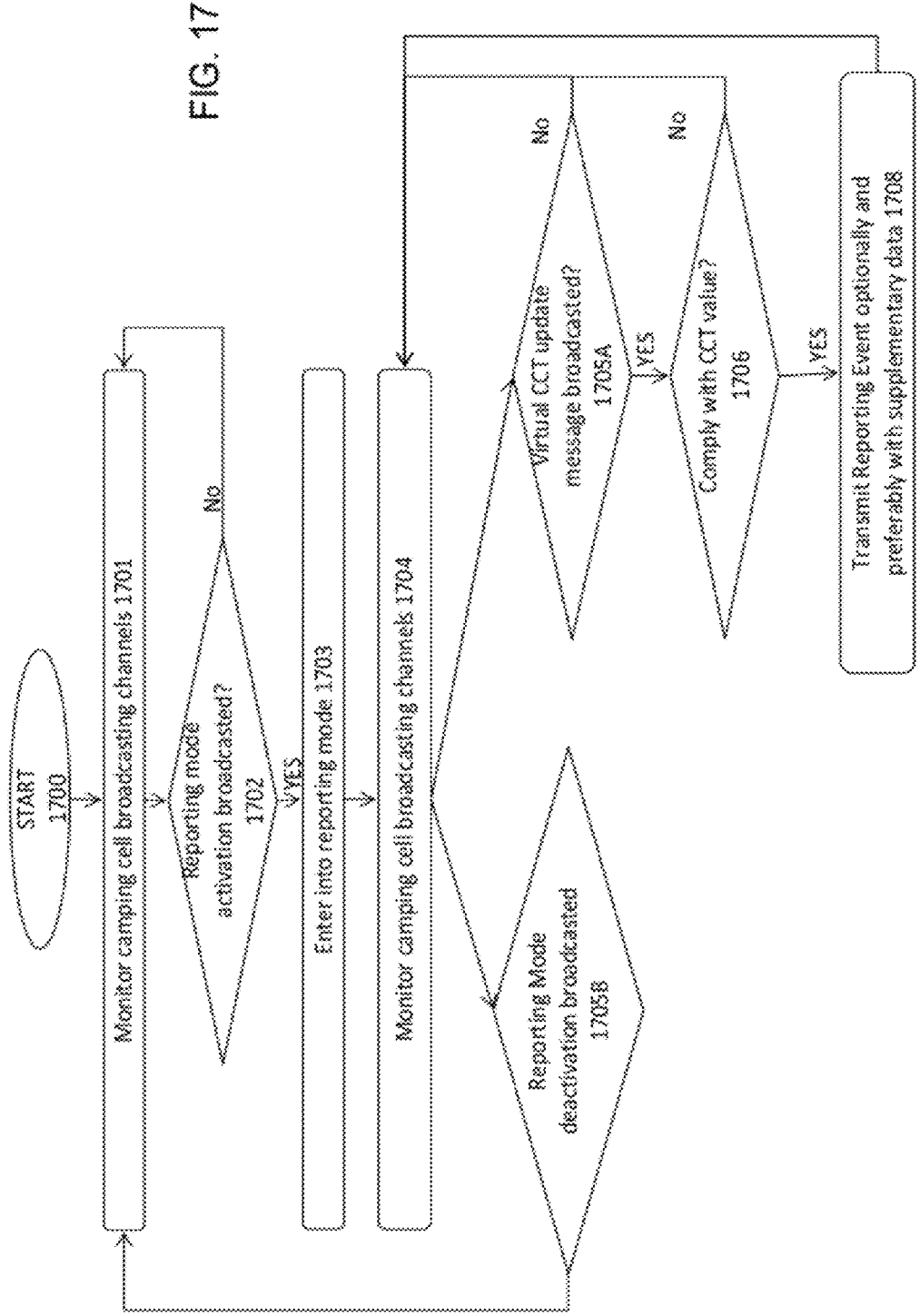
FIG. 17 shows a top-level flow chart of the client side CCD simulator operation in accordance with a second preferred embodiment of the present invention.
Figure 18:
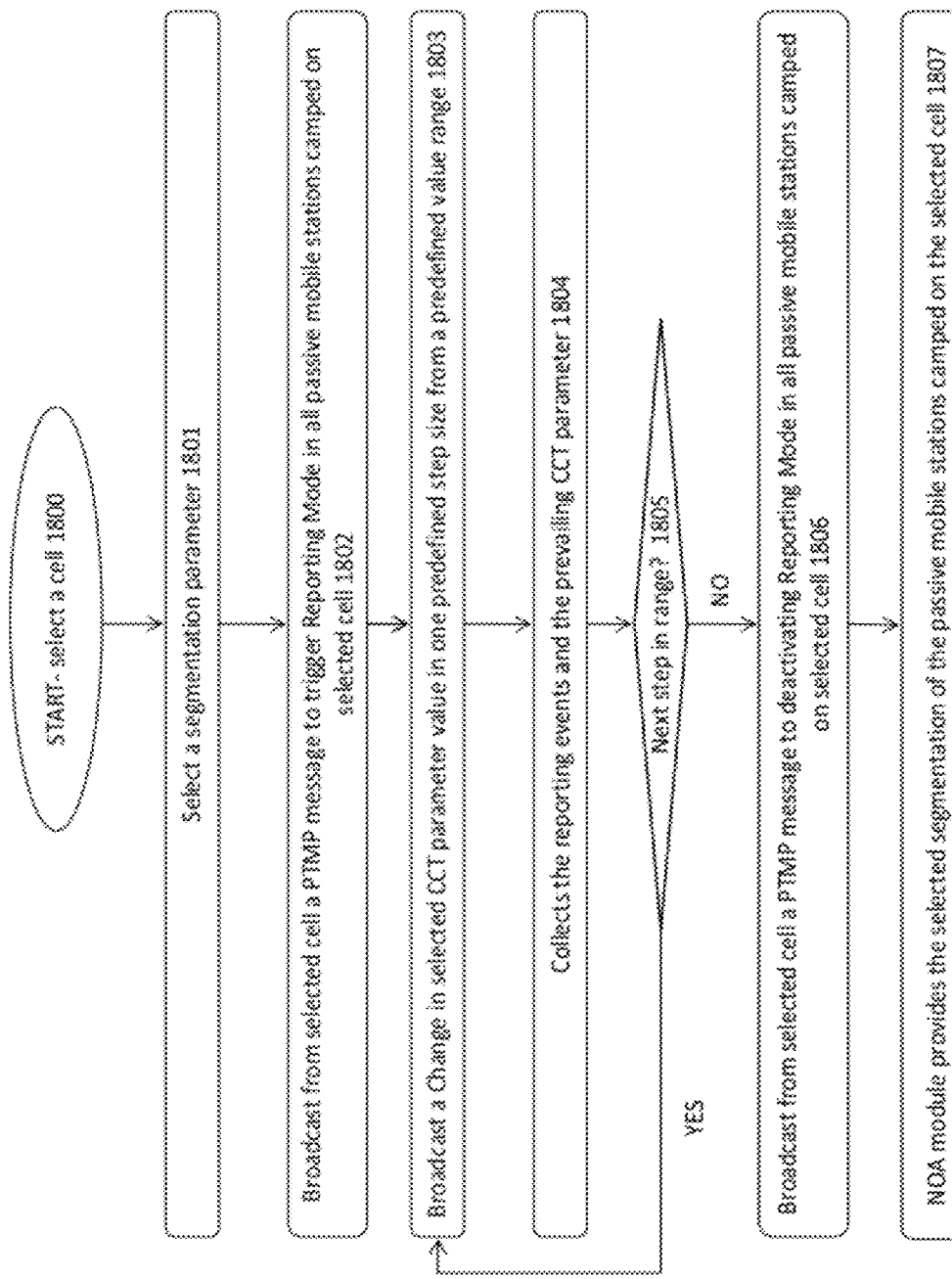
FIG. 18 shows a detailed flowchart of the operation of FIG. 15's client assisted NOS for acquiring PMS segmentation information.

FIG. 17 shows a top-level flow chart illustrating the client side CCD simulator operation:

Step 1701: The client program monitors the camping cell Broadcast channels;

Step 1702: If the client program detects that a Reporting Mode activation message is broadcasted it continues to step 1703, otherwise it returns to step 1701;

Step 1703: The client program enter into Reporting mode, in which it starts monitoring the MS native CCD in real time;

Step 1704: If the client program detects that a CCT update messages is broadcasted it continues to step 1705, otherwise return to step 1704;

Step 1705A: The client program applies the CCT parameter and value upon the CCD simulator, if the MS does not comply with the CCT it continues to step 1706, otherwise return to step 1704;

Step 1705B: The client deactivates Reporting Mode and returns to step 1701;

Step 1706: The client program did not comply with the CCT and therefore will transmit a Reporting Event which could include supplementary data, such as the MS GPS coordinates;

FIG. 18 shows operation of the client assisted NOS 1600 for acquiring passive mobile station segmentation information includes the following steps:

Step 1800: Select a cell for PMS segmentation purposes.

Step 1801: Select a segmentation parameter

Step 1802: CCCM module 1601 sends a first PTMP message to trigger Reporting Mode in all passive mobile stations camped on selected cell.

Step 1803: CCCM module 1601 sends a second PTMP message to all the passive mobile stations camped on the selected cell instructing them to run their CCD simulators 1605 on a CCCM module 1601 provided CCT of the selected segmentation type. The CCD simulators 1605 determine whether their host mobile stations would or would not change their camping cell under the new CCT. CCD simulators 1605 that determine that their host mobile stations would change their camping cell 107, the CCD simulators 1605 send a reporting event to the network 100. Conversely, CCD simulators 1605 that determine that their host mobile stations would not change their camping cell 107, do not send a reporting event to the network 100.

Step 1804: REA module 1602 collects the reporting events and the prevailing CCT.

Step 1805: CCCM module 1601 increments or decrements the camping cell threshold to a new camping cell threshold.

Steps 1803 to Steps 1805 are repeated for a predetermined range of camping cell thresholds.

Step 1806: CCCM module 1601 deactivates the Reporting Mode in the cell.

Step 1807: NOA module 1603 provides the selected segmentation of the passive mobile stations camped on the selected cell.

FIGS. 19 to 22 demonstrate passive mobile station segmentation based on signal strength CCT parameter in the case of five mobile stations MS-1, MS-2, MS-3, MS-4 and MS-5 camping on two overlapping cells 109A and 109B.

FIG. 19 shows mobile stations MS-1, MS-2 and MS-3 are located in the overlapping region between cells 109A and 109B, the mobile station MS-4 is located in cell 109A and the mobile station MS-5 is located in cell 109B.

FIGS. 20A to 20D list the following information for each of the five mobile stations MS-1, MS-2, MS-3, MS-4 and MS-5: its present camping cell, an indication whether it is in reporting mode or not, the reception signal strength of each detected cell, the CCT of each detected cell, and a CCD decision regarding a camping cell selection. These Figures demonstrate the MS Manipulated NOS.

FIGS. 21A to 21D shows the same states as FIGS. 20A to 20D but instead of CCT it shows the simulated CCT and instead of native CCD decisions the simulated CCD decision. These Figures demonstrate the MS assisted NOS. FIG. 20A shows the initial allocation of the five mobile stations between the two camping cells 109A and 109B at time T=0. The three mobile stations MS-1, MS-2 and MS-3 detect both the cells 109A and 109B and have selected cell 109A as their camping cell. The mobile station MS-4 has necessarily camped on cell 109A and does not detect cell 109B. Conversely, the mobile station MS-5 has necessarily camped on cell 109B and does not detect cell 109A. Both cells 109A and 109B have the same initial CCT value of −105 dBm. FIG. 19A shows the four mobile stations MS-1, MS-2, MS-3 and MS-4 camped on cell 109A are in Reporting Mode and the mobile station MS-5 camped on cell 109B is not in reporting mode.

FIG. 20B shows cell 109A's CCT is changed from its initial value to −70 dBm. The four mobile stations MS-1, MS-2, MS-3 and MS-4 camped on cell 109A run CCD procedures to determine whether they should remain on cell 109A or possibly camp on cell 109B. The three mobile stations MS-1, MS-2 and MS-4 determine they should remain camped on cell 109A. The mobile station MS-3 determines that it should change its camping cell to cell 109B. Accordingly, the mobile station MS-3 uploads a reporting event regarding its newly preferred camping cell.

FIG. 20C shows cell 109A's CCT is changed from its last value −70 dBm to −49 dBm. The three mobile stations MS-1, MS-2 and MS-4 camping on cell 109A run CCD procedures to determine whether they should remain on cell 109A or possibly camp on cell 109B. The two mobile stations MS-1 and MS-2 determine they should change their camping cell to cell 109B. Accordingly, the mobile stations MS-1 and MS-2 upload reporting events regarding their newly preferred camping cell. The mobile station MS-4 determines that cell 109A is no longer a suitable camping cell and therefore it enters no service mode.

FIG. 20D shows cell 109A's CCT is reverted from its last value −49 dBm to its original value −105 dBm. The three mobile stations MS-1, MS-2 and MS-3 now camping on cell 109B run CCD procedures as a matter of course and will determine that they should return to camp on cell 109A which is preferable over cell 109B. Accordingly, the mobile stations MS-1, MS-2 and MS-3 upload reporting events on their return to their original camping cell 109A. The mobile station MS-4 determines that cell 109A reverts to be a suitable camping cell and therefore leaves the no service mode and returns to camp on cell 109A. Accordingly, the mobile station MS-4 uploads a reporting event on its return to its original camping cell 109A.

The steps shown in FIGS. 21B-D are similar to those described above with respect to FIGS. 20 B-D.

FIG. 22A shows the end result of the PMS segmentation where the NOS received the identities of all passive mobile stations camping on cell 109A, additionally the NOS received the signal strength in which these passive MS receiver cell 109A, and what other neighboring cell they receive.

Such information is important for many applications including, without intention of being limited in any way, cellular network planning, maintenance and optimization. Other applications are related to Location services which could be commercial or for security purposes since from the MS received signal strength its location could be calculated.

FIG. 22B shows a histogram of how many MS receive each signal strength range. The histogram assist in understanding the Quality Of Services (QOS) experienced by subscribers camping on cell 109A;

As used herein the term "about" refers to ±10%.

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

EXAMPLES

Reference is now made to the following examples, which together with the above descriptions, illustrate the invention in a non limiting fashion.

The Network Operations System (NOS) of the present invention was tested as part of a pilot study using a public cellular network operating using UMTS technology. The NOS was used to run several segmentations on various cells of the public network when in an operative state. Segmentation was effected using a radio related CCT parameter as defined in 3GPP TS-25.304 entitled "User Equipment (UE) procedures in idle mode and procedures for cell reselection in connected mode" (www.3gpp.org/ftp/Specs/html-info/25304.htm).

The present system utilized the following CCT parameters:
1. Qqaulmin/Qrxlevmin—to obtain the signal quality as (dB)/strength (dBm) that the mobile stations (MS) receive from the camping cell analyzed.
2. Qoffset with Sintersearch/Sintrasearch—to obtain the difference between signal strength/quality of neighboring cells and the camping cell for the MS camping on the camping cell. The received signal strength/quality can be calculated from the difference between the neighboring cells and the camping cell and the signal strength/quality of the camping cell.

The segmentation process and the final result are illustrated in FIGS. 19-22B.

The data from the segmentation processes were processed by the NOA module which produces the following user tools:
  i. Analyze Cell Quality of Service (QOS): the present system provided network operators a quick (real time), and accurate status report about the signal strength/quality received by MS camping on an analyzed camping cell and its neighboring cells. The system operated on cells in urban areas with MS located in private offices and houses. Typically, in order to analyze the cell QOS network, cellular providers/operators utilize drive test vehicles that physically monitor the signal strength/quality in public areas.

The data was then integrated with other systems that monitor network activities such as calls and provided these systems with an analysis of the cell QOS.

ii. Load Balancing: Use of the present system enabled steering of idle subscribers between cells upon detection of radio interference level or resource overload. Steering relied on existing segmentations that were used to build a Cell Relation Matrix (CRM) to select the correct neighbor for the steering. Additionally, the present system used real time segmentation to determine the best steering path based on MS distribution in the cell service area.

The present system produced a dynamic and accurate response to constantly changing traffic and radio environment which resulted in optimization of load balancing between cells (Table 1). As a result, the capacity of the service area which the present system operated on has increased, fewer calls were dropped and more calls were received.

TABLE 1

Cell load prior to and following load redistribution as effected using the present system

| Load After | Load before | Cell |
|---|---|---|
| 30% | 85% | 111 |
| 20% | 10% | 222 |
| 16% | 0% | 333 |
| 27% | 20% | 444 |
| 42% | 42% | 555 |
| 20% | 10% | 666 |
| 12% | 0% | 777 | iii. Neighbor List Optimization: Utilizing several segmentations the NOA constructed a Cell Relation Matrix (CRM) for cells in which it operated. The present system then identified for some cells, a neighboring cells list that included cells that do not have any radio overlap with the analyzed cell. Therefore the present system deleted those cells from the neighboring cells list. Additionally the present system found several other cells that were not in the neighboring list but did have radio overlap with the analyzed cell and consequently added those cells to the Neighboring cells list.

The end result was that the neighboring cells list of each cell the present system operated on included only cells with a radio overlap capable of supporting above threshold QOS, in addition, the percent dropped calls decreased as a result of use of the present system.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A system for obtaining information relating to an idle mobile station in a radio access network, the system comprising a computing platform being in communication with a radio network controller of said radio access network and being configured for:
    (a) selecting a segmentation parameter for said radio access network;
    (b) generating and sending at least one input signal through said radio network controller to said radio access network;
    (c) identifying in data outputted by said radio network controller an output signal resulting from said input signal, said output signal including, at least in part, switching oriented data associated with routing of services received from at least one idle mobile station;
    (d) determining radio oriented data for the radio access network based on the at least one input signal and the switching oriented data;
    (e) providing an indication of said at least one mobile station in relation to a particular segmentation associated with said selected segmentation parameter; and
    (f) steering the at least one mobile station across one or more cells operating within the radio access network based on the indication of the at least one mobile station in relation to the particular segmentation.

2. The system of claim 1, wherein said at least one input signal is sent to a specific cell operating within said radio access network.

3. The system of claim 1, wherein said at least one input signal includes instructions for modifying a registration area code of a cell.

4. The system of claim 3, wherein said at least one input signal includes instructions for modifying a cell camping threshold of said cell.

5. The system of claim 1, wherein said at least one input signal includes a change in registration area, a change in a cell camping threshold (CCT) and restoration of said registration area.

6. The system of claim 5, wherein said change in the CCT is followed by said restoration of said registration area within seconds to hours.

7. A method of automatic optimization of a cellular network comprising:
    (a) selecting a segmentation parameter for a plurality of cells of said cellular network;
    (b) determining, based on said selected segmentation parameter, a plurality of segmentations of each of said plurality of cells;
    (c) generating and sending an input signal through a radio network controller to the cellular network;
    (d) identifying in data outputted by said cellular network an output signal resulting from the input signal, said output signal including, at least in part, switching oriented data associated with routing of services to idle mobile stations (MS);

(e) obtaining radio oriented data for the cellular network relating to said idle mobile stations (MS) in said plurality of cells of the cellular network based on the switching oriented data and the input signal, thereby determining a load state of each of said plurality of cells, wherein the obtaining includes recursively obtaining information relating to said idle mobile stations in said plurality of cells of said cellular network for each of said plurality of segmentations; and (f) optimizing the cellular network based on said load state of each of said plurality of cells.

8. The method of claim 7, wherein said optimizing is effected by shutting down specific cells having a load state lower than a predetermined threshold.

9. The method of claim 7, wherein said optimizing is effected by steering one or more idle mobile stations between cells of said plurality of cells.

10. The method of claim 7, wherein the obtaining includes:
providing an indication of said idle mobile stations (MS) in relation to one or more segmentations of said plurality of cells associated with said selected segmentation parameter.

11. A method comprising:
(a) selecting a segmentation parameter for a radio access network;
(b) generating and sending at least one input signal through a radio network controller to said radio access network;
(c) identifying in data outputted by said radio network controller an output signal resulting from said input signal, said output signal including, at least in part, switching oriented data associated with routing of services received from at least one idle mobile station;
(d) determining radio oriented data for the radio access network based on the at least one input signal and the switching oriented data;
(e) providing an indication of the at least one mobile station in relation to a particular segmentation associated with said selected segmentation parameter; and
(f) steering said at least one mobile station across one or more cells operating within said radio access network based on said indication of said at least one mobile station in relation to said particular segmentation.

12. The method of claim 11, wherein said at least one input signal includes instructions for modifying a registration area code of a cell.

13. The method of claim 12, wherein said at least one input signal includes instructions for modifying a cell camping threshold of said cell.

14. At least one non-transitory computer-readable medium encoded with instructions that, when executed by a processor, perform:
(a) selecting a segmentation parameter for a radio access network;
(b) generating and sending at least one input signal through a radio network controller to said radio access network;
(c) identifying in data outputted by said radio network controller an output signal resulting from said input signal, said output signal including, at least in part, switching oriented data associated with routing of services received from at least one idle mobile station;
(d) determining radio oriented data for the radio access network based on the at least one input signal and the switching oriented data;
(e) providing an indication of the at least one mobile station in relation to a particular segmentation associated with said selected segmentation parameter; and
(f) steering said at least one mobile station across one or more cells operating within said radio access network based on said indication of said at least one mobile station in relation to said particular segmentation.

15. The non-transitory computer-readable medium of claim 14, wherein said at least one input signal includes instructions for modifying a registration area code of a cell.

16. The non-transitory computer-readable medium of claim 15, wherein said at least one input signal includes instructions for modifying a cell camping threshold of said cell.

17. At least one non-transitory computer-readable medium encoded with instructions that, when executed by a processor, perform:
(a) selecting a segmentation parameter for a plurality of cells of a cellular network;
(b) determining, based on said selected segmentation parameter, a plurality of segmentations of each of said plurality of cells;
(c) generating and sending an input signal through a radio network controller to said cellular network;
(d) identifying in data outputted by said cellular network an output signal resulting from the input signal, said output signal including, at least in part, switching oriented data associated with routing of services to idle mobile stations (MS);
(e) obtaining radio oriented data for said cellular network relating to said idle mobile stations (MS) in said plurality of cells of said cellular network based on the switching oriented data and the input signal, thereby determining a load state of each of said plurality of cells, wherein the obtaining includes recursively obtaining information relating to said idle mobile stations in said plurality of cells of said cellular network for each of said plurality of segmentations; and
(f) optimizing said cellular network based on said load state of each of said plurality of cells.

18. The non-transitory computer-readable medium of claim 17, wherein said optimizing is effected by shutting down specific cells having a load state lower than a predetermined threshold.

19. The non-transitory computer-readable medium of claim 17, wherein said optimizing is effected by steering one or more idle mobile stations between cells of said plurality of cells.

20. The non-transitory computer-readable medium of claim 17, wherein the obtaining includes:
providing an indication of said idle mobile stations (MS) in relation to one or more segmentations of said plurality of cells associated with said selected segmentation parameter.

* * * * *